(12) United States Patent
Peterson

(10) Patent No.: US 12,504,259 B2
(45) Date of Patent: Dec. 23, 2025

(54) OPEN FIELD GAME ARRANGEMENT COMPRISING RESPONSIVE TARGETS

(71) Applicant: Off Course Productions, Inc., Palm Springs, CA (US)

(72) Inventor: Robert G. Peterson, Palm Springs, CA (US)

(73) Assignee: Off Course Productions, Inc., Palm Springs, CA (US)

( * ) Notice: Subject to any disclaimer, the term of this patent is extended or adjusted under 35 U.S.C. 154(b) by 0 days.

(21) Appl. No.: 18/947,130

(22) Filed: Nov. 14, 2024

(65) Prior Publication Data

US 2025/0164220 A1    May 22, 2025

Related U.S. Application Data

(60) Provisional application No. 63/600,224, filed on Nov. 17, 2023.

(51) Int. Cl.
| | | |
|---|---|---|
| *F41J 5/24* | (2006.01) | |
| *F41J 5/14* | (2006.01) | |
| *A63B 71/06* | (2006.01) | |
| *F41J 7/00* | (2006.01) | |
| *F41J 9/02* | (2006.01) | |
| *F41J 9/08* | (2006.01) | |

(52) U.S. Cl.
CPC . *F41J 5/24* (2013.01); *F41J 5/14* (2013.01); *A63B 71/0605* (2013.01); *F41J 7/00* (2013.01); *F41J 9/02* (2013.01); *F41J 9/08* (2013.01)

(58) Field of Classification Search
None
See application file for complete search history.

(56) References Cited

U.S. PATENT DOCUMENTS

| | | |
|---|---|---|
| 2,695,173 A | 11/1954 | Sterne |
| 3,369,812 A | 2/1968 | McKee |
| 3,877,704 A | 4/1975 | Bayley |
| 3,889,957 A | 6/1975 | Klabacka |
| 4,006,907 A | 2/1977 | Heffley, Jr. |
| 4,179,832 A | 12/1979 | Lemelson |
| 4,335,939 A | 6/1982 | Krumlauf |
| 4,559,090 A | 12/1985 | Grutzner |
| 5,354,052 A | 10/1994 | Nicholls |
| 5,478,077 A | 12/1995 | Miyahara |
| 5,980,392 A | 11/1999 | Cox |

(Continued)

FOREIGN PATENT DOCUMENTS

WO    2007037705 A1    4/2007

OTHER PUBLICATIONS

WDRB, Cosmic Driving Range, p. 1 (Jun. 2, 2015).

(Continued)

*Primary Examiner* — Jason T Yen
(74) *Attorney, Agent, or Firm* — UltimatEdge IP Law Group, P.C.; Dean G. Stathakis

(57) ABSTRACT

An open field game arrangement comprising a playing field including one or more unmanned vehicles that serve as ground or air targets, one or more display projectors that generate holographic targets, and a control system that determines whether a particular target was struck and generates one or more responses, such as a sound effect, a smoke effect, a scoring event, or other preprogrammed responses to a particular event.

20 Claims, 14 Drawing Sheets

(56) References Cited

U.S. PATENT DOCUMENTS

| | | |
|---|---|---|
| 6,398,662 B1 | 6/2002 | Cox |
| 6,462,720 B1 | 10/2002 | Yamashita et al. |
| 6,554,284 B2 | 4/2003 | Chou |
| 6,569,028 B1 | 5/2003 | Nichols et al. |
| 9,605,926 B1* | 3/2017 | Means ................... G01S 19/14 |
| 9,977,114 B1 | 5/2018 | Herbert et al. |
| 10,232,241 B2 | 3/2019 | Peterson et al. |
| 10,695,635 B2 | 6/2020 | Peterson et al. |
| 11,660,514 B1* | 5/2023 | Black ................... A63B 69/406 |
| | | 273/395 |
| 2002/0109301 A1 | 8/2002 | Chou |
| 2004/0204258 A1 | 10/2004 | Hanoun |
| 2005/0153262 A1 | 7/2005 | Kendir |
| 2007/0078018 A1 | 4/2007 | Kellogg et al. |
| 2008/0125293 A1 | 5/2008 | Ng |
| 2009/0106888 A1 | 4/2009 | Mattson, Jr. et al. |
| 2009/0291782 A1 | 11/2009 | Hinn |
| 2014/0274155 A1 | 9/2014 | Langberg |
| 2016/0023073 A1 | 1/2016 | Bush |
| 2016/0158626 A1 | 6/2016 | Dolige |
| 2020/0384341 A1 | 12/2020 | Peterson et al. |
| 2023/0019154 A1* | 1/2023 | Guinn ................. A63F 13/5255 |
| 2023/0047129 A1* | 2/2023 | Lalaoua ............. G09F 15/0037 |

OTHER PUBLICATIONS

WIPO, PCT Form IB373, International Preliminary Report on Patentability for International Patent Application Serial No. PCT/US2017/012729, pp. 9 (Jul. 17, 2018).

WIPO, PCT Form ISA210, International Search Report for International Patent Application Serial No. PCT/US2017/012729, pp. 5 (May 10, 2017).

WIPO, PCT Form ISA237, Written Opinion for International Patent Application Serial No. PCT/US2017/012729, pp. 8 (May 10, 2017).

EPO, EPO Form 1507U, Partial European Search Report for European Patent Application No. 24213409.6, pp. 13, (Apr. 29, 2025).

* cited by examiner

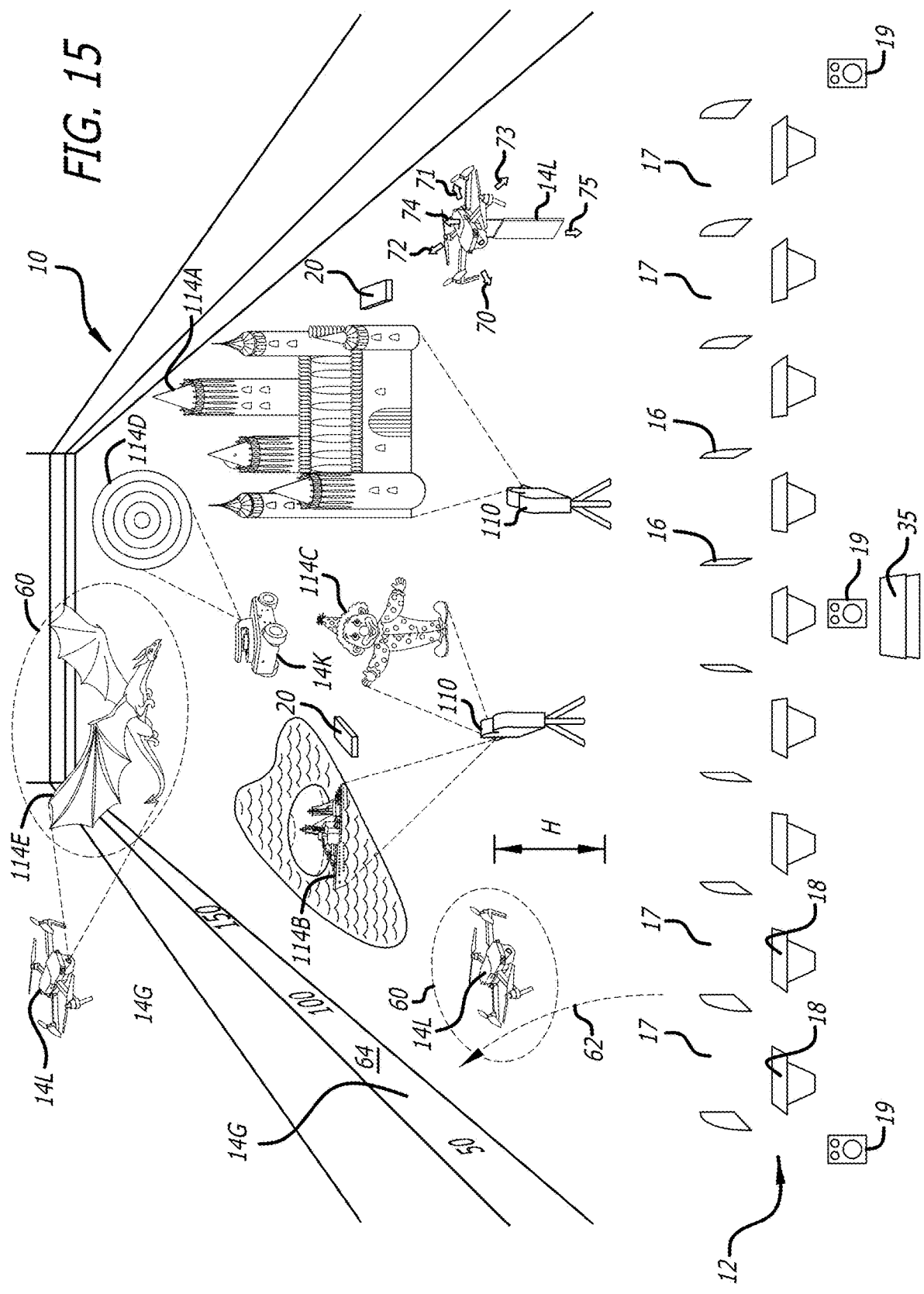

OPEN FIELD GAME ARRANGEMENT COMPRISING RESPONSIVE TARGETS

This application is a 35 U.S.C. § 111 patent application that claims the benefit of priority and is entitled to the filing date pursuant to 35 U.S.C. § 119(e) of U.S. Provisional Patent Application 63/600,224, filed Nov. 17, 2023, the content of which is hereby incorporated by reference in its entirety.

Large open fields are used for a variety of purposes. For example, farms and pastures are used for agricultural cultivation and livestock raising. Parks and meadows can be used for recreational activities such as camping, picnicking, cycling, jogging, and horseback riding. Sports stadiums and fields are used for recreational, amateur, and professional sporting events. Such large open fields provide enjoyment to the participants and financial gain to the owners.

However, many large, open field areas are underused and generate little or no income much of the time. Such large open fields include, without limitation, farms, pastures, parks, golf courses and driving ranges, horse and car racing tracks, football, baseball, and soccer stadiums, that. As such, it would be desirable to provide a means to use these open field areas of additional activities in order to increase the enjoyment of its participants and enhance revenue for the owners.

The present specification provides an open field game arrangement that enables a large, open field to generate additional income when not being used for its primary purpose, or at any time. In addition, an open field game arrangement disclosed herein may take advantage of darkness to provide a special entertainment experience, but it also can be used in the daytime.

SUMMARY

The present specification discloses, in part, an open field game arrangement disclosed herein a system comprises a playing field including one or more targets, a launch area where a user launches a projectile to a particular target, a control system that detects whether a projectile hit a target and initiates a response.

A control system disclosed herein comprising a sensing system configured to detect the presence of a projectile disclosed herein and a response system in communication with the sensing system and configured to initiate a response based on input from such sensing system after projectile detection. A sensing system disclosed herein can be a sensing system that is part of a target disclosed herein or nearby such target or a sensing system remote from the target. Based on the input received from the sensing system, a response system disclosed herein controls the one or more lights to generate a light effect, one or more sound generators to generate a sound effect, one or more fog generators to generate a smoke effect, one or more image generators to generate a visual effect, and/or a scoring system to generate a score displayed on a fixed screen or on a portable device running an app, such as a smart phone.

A disclosed target can be a physical structure or a projected virtual image and can be a ground-based or air-based target that can be a stationary target, a mobile target, or have the capacity of being able to alternatively mobile or remain stationary. A stationary, aerial target can be held aloft at a predetermined height, distance, and lateral position measured from a launch area. A mobile, ground target can be moved at various distances and lateral positions measured from a launch area. A mobile, aerial target can be held aloft at varying heights, distances, and lateral positions measured from a launch area. A target disclosed herein can include one or more lights, one or more sound generators, one or more fog generators, one or more image generators, or a combination thereof in order to generate a light effect, sound effect and/or smoke effect. A projectile disclosed herein can be a ball, a bullet, an arrow, an ax, or other object controlled by an individual. Non-limiting examples of a ball include a golf ball, a baseball, a soccer ball, or a football.

The open field game arrangement may further comprise a scoring system, which may be manually operated or automatically programed, such as, e.g., under the control of the control system, in order to create and keep tally of scores when a target is hit by a user.

BRIEF DESCRIPTION OF THE DRAWINGS

The accompanying drawings, which are incorporated in and constitute a part of this specification, illustrate aspects of the disclosed subject matter in at least one of its exemplary embodiments, which are further defined in detail in the following description. Features, elements, and aspects of the disclosure are referenced by numerals with like numerals in different drawings representing the same, equivalent, or similar features, elements, or aspects, in accordance with one or more embodiments. The drawings are not necessarily to scale, emphasis instead being placed upon illustrating the principles herein described and provided by exemplary embodiments of the invention. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein. In such drawings:

FIG. 3B showing a schematic view of a control panel used in the pylon target of FIG. 3A; and FIG. 3C is a schematic view of the pylon target of FIG. 3A;

FIG. 4B showing a perspective view of the dome target of FIG. 4A;

FIG. 15 is an end view of an alternative embodiment of an open field game arrangement disclosed herein with one or more holographic targets and launch area.

| Listing of Reference Numbers Associated with Drawings | |
|---|---|
| Ref. No. | Element |
| 10 | Open field game arrangement |
| 11 | Plastic sheet |
| 12 | Launch area |
| 14 | Target |
| 14A | Pylon target |
| 14B | Dome target |
| 14C | Floating dome target |
| 14D | Transparent dome target |
| 14E | Pop-up dome target |
| 14F | Skirt Target |
| 14G | Banner target |
| 14H | Flat target |
| 14I | Control system target |
| 14J | Mobile manned ground target |
| 14K | Unmanned ground target |
| 14L | Unmanned aerial target |
| 16 | Divider |
| 17 | Lane |
| 18 | Scoring kiosk |
| 19 | Speakers |
| 20 | Control system |
| 30 | Sensing system |
| 32 | Sensor |
| 35 | Tracking system |
| 40 | Response system |
| 42 | Controller |
| 43 | Central controller |
| 44 | Light emitter |
| 45 | Light |
| 46 | Sound generator |
| 48 | Panel |
| 50 | Power cable |
| 52 | Power source |
| 54 | Blower |
| 60 | Detection field |
| 62 | Projectile path |
| 64 | Target surface |
| 70 | Forward |
| 71 | Backward |
| 72 | Left |
| 73 | Right |
| 74 | Upward |
| 75 | Downward |
| 80 | Skin |
| 82 | Inflation port |
| 84 | Ears |
| 85 | Foam board |
| 86 | Rib |
| 88 | Zip lock opening |
| 89 | Zipper opening |
| 90 | Power cable opening |
| 92 | Tie-down cable |
| 94 | Top skin |
| 96 | Bottom skin |
| 98 | Transparent bladder |
| 100 | Open field game arrangement |
| 110 | Display projectors |
| 114 | Holographic target |
| 114A | Castle target |
| 114B | Ship target |

-continued

| Listing of Reference Numbers Associated with Drawings | |
|---|---|
| Ref. No. | Element |
| 114C | Clown target |
| 114D | Bullseye target |
| 114E | Flying dragon target |

DETAILED DESCRIPTION

An open field game arrangement disclosed herein comprises a playing field comprising one or more targets, a launch area, and a control system. A target disclosed herein can be a physical target or a projected image like a holographic target. A launch area disclosed herein is the location where a user takes aim and launches a projectile to a given target with the desire to strike that target. A control system disclosed herein system detects when a particular target disclosed herein has been struck by a projectile (referred to as a proximity event), generates a response when that target is hit or missed, and tallies a score based on the performance of a given user.

Figure 1:
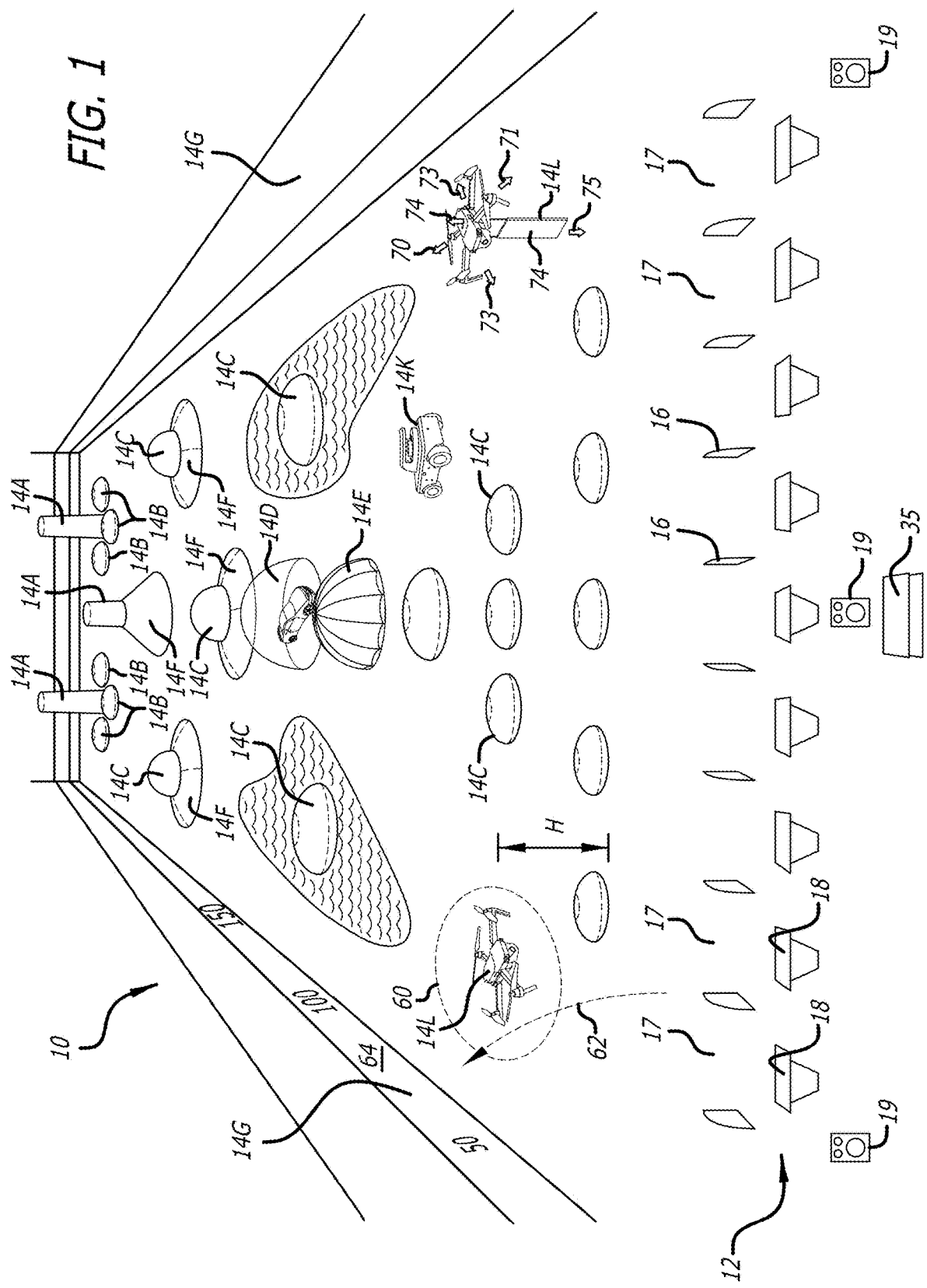
FIG. 1 illustrates an end view of an open field game arrangement disclosed herein with one or more targets and launch area.

In some embodiments, an open field game arrangement is an open field game arrangement 10. As shown in FIG. 1, open field game arrangement 10 is a typical golf driving range and comprises a control system, a launch area, and a variety of types of targets. It is understood that a driving range for golf balls is just one example of an open field game arrangement disclosed herein and that a variety of open areas may be used to create an open field game arrangement. For example, a fairway or green of a gold course, a playing field of baseball, football, or soccer stadium, a shooting range, a park, a field, or any other open area suitable to establish an open field game arrangement disclosed herein.

Figure 6:
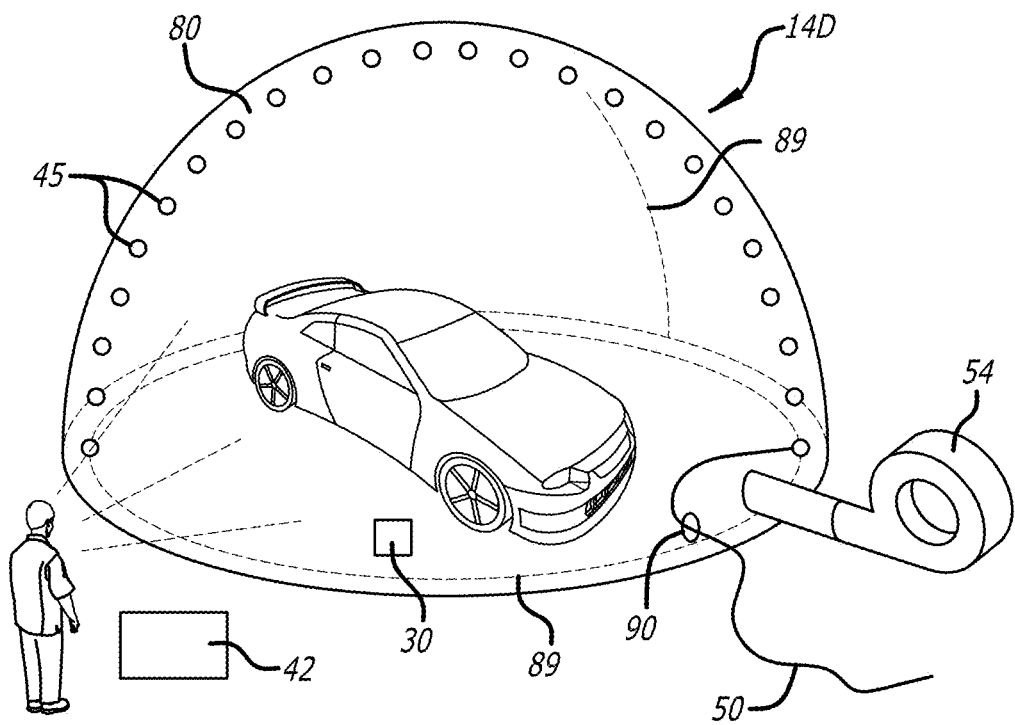
FIG. 6 illustrates a front view of dome target disclosed herein.

Referring to FIG. 1, exemplary open field game arrangement 10 comprises one or more pylon targets 14A are located farthest away from launch area 12, which, in some embodiments, are in the range of seven to fifteen feet tall. Each of the one or more pylon targets 14A is surrounded by a plurality of dome targets 14B. Open field game arrangement 10 can also include water features, such as, e.g., a lake, pond, or river, filled with water, with a floating dome target 14C anchored in each water feature. In front of the two rear pylon targets 14A is a pylon target 14A with a skirt target 14F. In front of those are some ground-based, dome targets 14C with skirts target 14F. There also is a transparent dome target 14D, which houses a car (or another object), as shown in FIG. 6. There also is a pop-up dome target 14E, shown in more detail in FIGS. 7 & 8, and various other dome targets 14B in the front portion of the field. On the sides of the field are banner targets 14G, which in conjunction with launch area 12 defines the area of open field game arrangement 10. Banner targets 14G may also serve as targets and which include markings indicating the distance from launch area 12 (such as, e.g., 50 yards, 100 yards, 150 yards, 200 yards, 250 yards, 300 yards, and so forth). Also depicted are unmanned ground target 14K and unmanned aerial target 14L.

Figure 2:
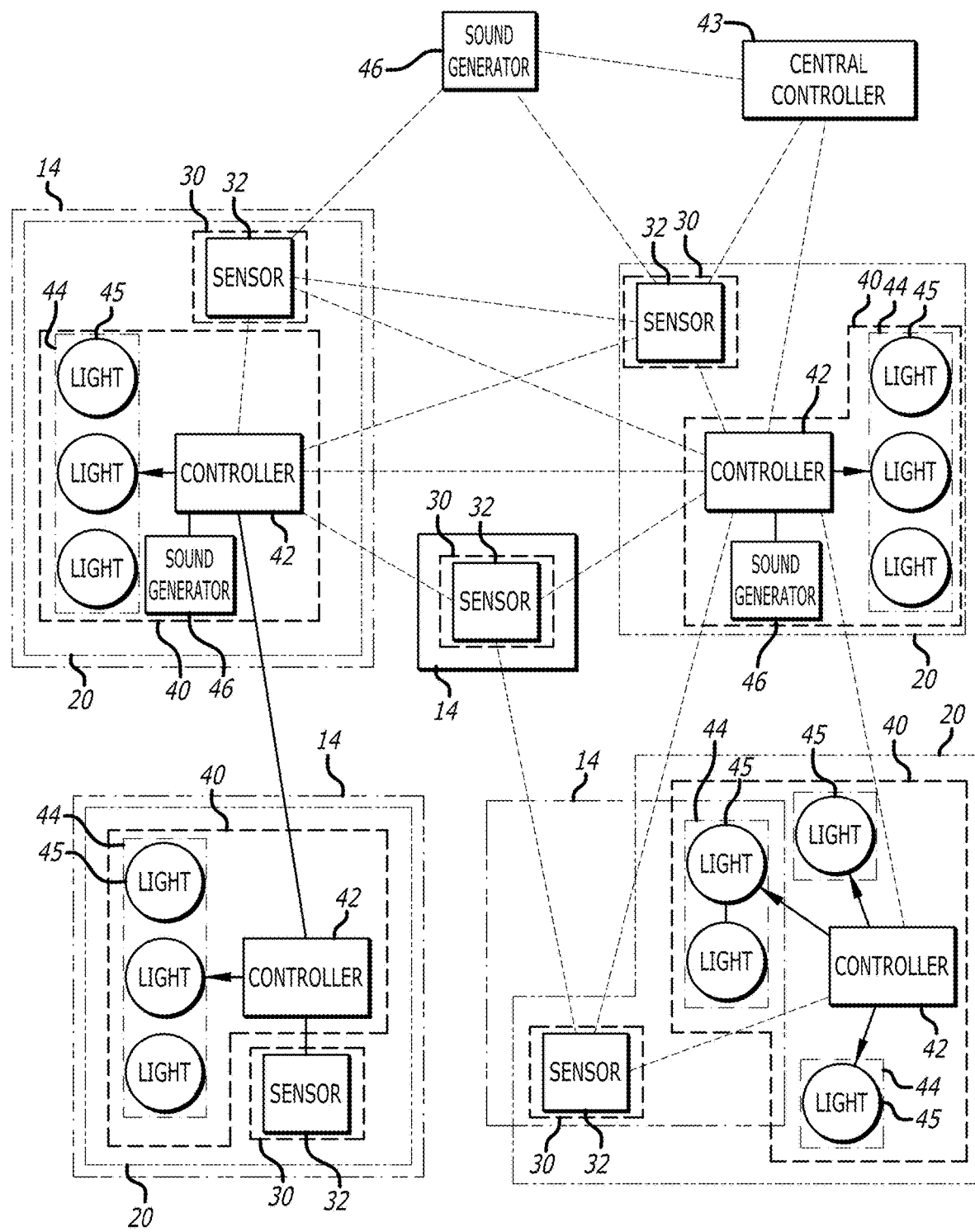
FIG. 2 illustrates a diagram of a control system disclosed herein.

Open field game arrangement 10 comprises a control system. A control system disclosed herein comprises a sensing system for determining whether a target disclosed herein has been struck by a projectile, response system for generating one or more responses when a target is hit and/or missed, and optionally, a scoring system that tallies the performance of a given user. FIG. 2 illustrates one type of control system disclosed herein that may be used for an open field game arrangement disclosed herein. In this exemplary arrangement, each target has a control system 20 comprising a sensing system 30 comprising a sensor 32, a response system 40 comprising a controller 42, a light emitter 44 and/or a sound generator 46, and a power source 50. Controller 42 communicates through wired or wireless communication paths, or a combination thereof, with sensor 32, light emitter 44, and sound generator 46. Controller 42 also communicates with other controllers 42 in the system in a daisy chain arrangement so all control systems 20 can communicate with each other. Such communication network may be wired or wireless or a combination thereof and may be a LAN, WLAN, Ethernet, token ring, CAN bus, FDDI ring or other communications network infrastructure. Controller 42 can control lights and sounds for more than one target 14, so it is not necessary to have response system 40 with each target. Typically, control system 20 comprising a central controller 43 is established when controllers 42 of multiple control systems 20 are integrated with one another to facilitate ease of use and control. Controller 42 may employ one or more integrated circuits (IC), e.g., ASIC (Application-Specific IC, FPGA (Field Programmable Array), with memory capability and may include analog-to-digital converters and other components. In some embodiments, control system 20 comprising central controller 43 is set up in launch area 12 of Open field game arrangement 10. In some embodiments, control system 20 comprising central controller 43 is set up within the playing field of open field game arrangement 10.

In some embodiments, sensing system 30 comprising sensor 32 can be located within, on, or adjacent to each target 14 to determine when that target has been impacted by a projectile. Such impact determination is referred to as a proximity event. Sensor 32 may be in the form of an image sensor, a microphone, a motion sensor, a piezoelectric sensor, a thermal sensor, or other local transducer adapted to generate an electrical or optical or other usable signal in response to an image movement, an audible sound, mechanical vibration, or physical impact. Sensor 32 is configured to define a detection field 60 that detects a proximity event. Detection field 60 can minimally define a proximity event as whether a projectile hit or impacted a target but can also be configured to detect how close or proximal the projectile was to a target. Detection field 60 can be any 2-dimensional or 3-dimensional shape. In some embodiments, sensing system 30 can further and optionally comprise a tracking system disclosed herein.

Response system 40 can generate one or more responses when a target is hit and/or missed, including no response. In some embodiments, response system 40 comprising light emitter 44 and sound generator 46 can be located within, on, or adjacent to each target 14 to initiate a response to a projectile striking target 14. Light emitter 44 is configured to emit a light effect including, without limitation, one or more lights 45 which can be of various sizes and shapes and emit light of one or more colors. One or more lights 45 of light emitter 44 can be halogen lights, LED lights, or laser lights, but other types of lights can also be used. Sound generator 22 is configured to generate a sound effect including, without limitation, a sound of a projectile hitting a target, a horn, a cheer, an explosion, a scream, a refrain of music. Response system 40 can further comprising a fog generator configured to generate a smoke effect including, without limitation, a mist, a rolling fog, a billowing fog, or a forceful smoke burst. Response system 40 can further comprising an image generator configured to generate a visual effect including, without limitation, an image of a hitting a target, an image of a target collapsing, an image of a target exploding, an image of a target on fire. In some embodiments, one or more responses from response system 40 comprising communicating with a scoring system disclosed herein to generate a score.

When sensor 32 detects a proximity event triggering that a target has been stuck by a projectile, that sensor 32 sends a signal to controller 42 associated with the particular target 14. A signal disclosed herein may be analog, digital or a combination of both and may be modulated in some form for transmission. In addition, a signal disclosed herein may be electrical or optical and transmission may be in the form of a hybrid electro-optic transmission. Upon reception of such signal, controller 42 is programmed to generate a response, such as, e.g., controlling an aspect of light emitter 44 to generate a light effect, controlling an aspect of sound generator 46 to generate a sound effect, controlling an aspect of a fog generator to generate a smoke effect and/or controlling an aspect of an image generator to generate a visual effect.

In some embodiments, a light effect caused by controller 42 includes, without limitation, initiating light emitter 44 to flash one or more lights 45 on and off, initiating light emitter 44 to change the color of some or all of one or more lights 45, or initiating light emitter 44 to cycle one or more lights 45 through various different colors for a brief period and then return to the original color. Additionally, controller 42 can control light emitter 44 of each target 14 independently so that light emitter 44 of each target 14 generates a different light effect or may generate one type of light effect with one subset targets and another type of light effect with a different subset of targets. In some embodiments, a sound effect caused by controller 42 includes, without limitation, initiating sound generator 22 to generate a sound effect for a brief period and then return to silence. In some embodiments, a sound effect caused by controller 42 includes, without limitation, a sound of a projectile hitting a target, a horn, a cheer, an explosion, a scream, a refrain of music. Additionally, controller 42 can control each target independently so that each target 14 generates a different sound effect or may generate one type of sound effect with one subset targets and another type of sound effect with a different subset of targets. In some embodiments, a smoke effect caused by controller 42 includes, without limitation, a mist, a rolling fog, a billowing fog, or a forceful smoke burst. Additionally, controller 42 can control each target independently so that each target 14 generates a different smoke effect or may generate one type of smoke effect with one subset targets and another type of smoke effect with a different subset of targets. In some embodiments, a visual effect caused by controller 42 includes, without limitation, an image of a hitting a target, an image of a target collapsing, an image of a target exploding, an image of a target on fire. Additionally, controller 42 can control each target independently so that each target 14 generates a different visual effect or may generate one type of visual effect with one subset targets and another type of visual effect with a different subset of targets.

In some embodiments, sensing system 30 comprising sensor 32 can be configured to define a proximity event of a projectile in a binary detection system where a hit is defined above a specified detection value and a miss if defined by a detection value below this specified detection value. In some embodiments, a hit can be defined as a direct hit by the projectile on a particular target 14 and detection field 60 covers only target 14 where at least one specified detection value is indicative of a hit in the center of target 14 and at least one specified detection value is indicative of a hit on the periphery of target 14. In some embodiments, a hit can be defined by a zone that includes both a particular target 14 and a defined area surrounding target 14 where at least one specified detection value is indicative of a hit in the center of target 14 and at least specified detection value is indicative of a hit on the defined area surrounding target 14. Upon receipt of the signal, controller 42 is programmed to generate a response based on whether sensing system 30 comprising sensor 32 signaled a hit. Additionally, and optionally controller 42 can be programed to generate a response based on whether sensing system 30 comprising sensor 32 signaled a miss. Additionally, and optionally, controller 42 can be programmed to signal a scoring system disclosed herein to update a user's score based on this hit or miss response.

In some embodiments, sensing system 30 comprising sensor 32 can be configured to define a proximity event of a projectile in a gradated detection system comprising detection field 60 where a hit or miss is not only defined by a specified detection value but also the proximity of the projectile to a particular target 14. As such, detection field 60 defined one or more additional specified detection values. In some embodiments, a hit can be defined as a direct hit by the projectile on target 14 and detection field 60 covers only target 14 where at least one specified detection value is indicative of a hit in the center of target 14 and at least one specified detection value is indicative of a hit on the periphery of target 14. In some embodiments, a hit can be defined by a zone that includes both target 14 and a defined area surrounding a target where at least one specified detection value is indicative of a hit in the center of target 14 and at least specified detection value is indicative of a hit on the defined area surrounding target 14. Upon receipt of the signal, controller 42 is programmed to generate a response not only based on whether sensing system 30 comprising sensor 32 signaled a hit but also on how close the projectile was to target 14 with a different response initiated depending on how close the projectile was to target 14. Additionally, and optionally controller 42 can be programed to generate a response based on whether sensing system 30 comprising sensor 32 signaled a miss. Additionally, and optionally, controller 42 can be programmed to signal a scoring system disclosed herein to update a user's score based on this hit or miss response and proximity to a target.

In addition to having control system 20 associated with each target, FIG. 2 also illustrates that additional control systems 20, or component parts thereof, can be dispersed around open field game arrangement 10 including. e.g., elsewhere in the open field game arrangement 10 not near target 14 or in launch area 12.

Since each controller 42 communicates with each other, all controllers 42 dispersed around open field game arrangement 10 know which target has been hit and also may be programmed to generate a response. As such, controller 42 associated with one target may also cause one or more light emitters 44 and/or sound generator 46 of other targets to generate a light and/or sound effect. For example, when sensing system 30 comprising sensor 32 of pylon target 14A in the far back of the field of FIG. 1 detects a hit by a projectile, controller 42 of pylon target 14A may cause one or more smaller dome targets 14B around the base of pylon target 14A to generate a light and/or sound effect. As another example, if a target 14 has a skirt target 14F around it, such as pylon 14A with skirt target 14F, skirt target 14F may also be made to generate a light and/or sound effect when sensing system 30 comprising sensor 32 of pylon 14A detects a hit, or pylon 14A may be made to generate a light and/or sound effect when sensing system 30 comprising sensor 32 of skirt target 14F detects a hit.

In addition, or as an alternative to sensing system 30, open field game arrangement 10 can employ a tracking system. A tracking system disclosed herein tracks a projectile and determines its trajectory path in order to determine a proximity event and thus detect whether a target was hit by the projectile. There are various known tracking systems that may be used including tracking systems employing cameras, Global Positioning Systems (GPS), Doppler radar, or 3D Doppler radar to track the projectiles. Non-Limiting examples of some known tracking systems include TOP-TRACER® (TopGolf, Dallas, TX), FLIGHTSCOPE® (FlightScope, Orlando, FL), TRACKMAN® (Trackman, Scottsdale, AZ), INRANGE® (InRange, London, UK), and FLITE™ (Flying Tee, Tulsa, OK). In some embodiments, a tracking system disclosed herein is integrated into a control system disclosed herein, like control system 20 and tracks a projectile as it approaches and then extrapolates the trajectory of the projectile to determine a proximity event and detect whether a projectile hit or missed a particular target. In some embodiments, and as shown in FIGS. 1 & 15, a tracking system disclosed herein is tracking system 35 located in launch area 12 and tracks a projectile from launch area 12 and then extrapolates the trajectory of the projectile to determine a proximity event and detect whether a projectile hit or missed a particular target. As with sensing system 30 comprising sensor 32, tracking system 35 can define a proximity event of a projectile using a binary detection system or a gradated detection system disclosed herein. These tracking systems include a stored map of an open field game arrangement disclosed herein such as open field game arrangement 10 and 100, and target locations contain within such arrangements and correlate the position of a projectile to determine a proximity event for a particular target, such as target 14 or holographic target 114. Upon detection of a hit, a tracking system generates a signal indicating that the target was hit and communicates that signal with controller 42 of response system 40 to generate a response, such as, e.g., a light effect and/or sound effect as well as other metrics like, e.g., information regarding statistics of a projectile and/or scoring information.

In some embodiments, if a hit is determined by a tracking system disclosed herein, then a signal from the tracking system can be sent to controller 42 where a response is initiated, such as, e.g., emitting a light effect from light emitter 44, generating a sound effect from sound generator 46, generating a smoke effect from a fog generator, generating a visual effect from an image generator, reporting statistics of a projectile and/or scoring information. Sensing system 30 may be implemented as a feature of a tracking system and controller 42 may be a central controller 43 associated with a centralized tracking system. In some embodiments, if a hit is determined by a tracking system disclosed herein, then a signal is sent from controller 42 of target 14 to controller 42 of launch area 12 where a response is initiated, such as, e.g., emitting a light effect from light emitter 44, generating a sound effect from sound generator 46, generating a smoke effect from a fog generator, generating a visual effect from an image generator, reporting statistics of a projectile and/or scoring information.

Control system 20 also comprises a scoring system. In some embodiments, controller 42 of response system 40 generate a score using a scoring system disclosed herein and communicates through wired or wireless communication paths with one or more display screens to display the score on the one or more display screens or other screens or displays. Non-limiting examples of one or more display screens include a fixed display screen or on a display screen of a portable device, such as a smart phone or tablet, running an application.

In some embodiments, controller 42 can be programmed to operate a binary scoring system based on the binary detection system disclosed herein employed by sensing system 30 comprising sensor 32. A binary scoring system disclosed herein evaluates the signal received from sensor 32, determines whether this signal is indicative of a hit or miss, and then assigned a point value based on this hit or miss determination. In some embodiments, a hit determination is awarded points, and a miss determination is awarded no points. In some embodiments, a hit determination is awarded points, and a miss determination is deducted or penalized points.

In some embodiments, controller 42 can be programmed to operate a gradated scoring system based on the gradated detection system disclosed herein employed by sensing system 30 comprising sensor 32. A gradated scoring system disclosed herein evaluates the signal received from sensor 32, determines whether this signal is indicative of a hit or miss and determines the proximity of a hit determination to a target, and then assigned a point value based on this hit or miss determination and proximity determination. In some embodiments, a hit determination in close proximity to a particular target 14 is awarded a high point value, a hit determination not in close proximity to a particular target 14 is awarded a point value, and a miss determination is awarded no points. In some embodiments, a hit determination in close proximity to a particular target 14 is awarded a high point value, a hit determination not in close proximity to a particular target 14 is awarded a point value, and a miss determination is deducted or penalized points. In some embodiments, a hit determination is associated with two or more proximity determinations to generate two or more-, three or more-, four or more-, or five or more-point values, and a miss determination is awarded no points. In some embodiments, a hit determination is associated with two or more proximity determinations to generate two or more-, three or more-, four or more-, or five or more-point values, and a miss determination is deducted or penalized points.

Target 14 is an object where a user of open field game arrangement 10 aims and launches a projectile towards with the goal of hitting the target. Target 14 can comprise complete control system 20 comprising both sensing system 30 and response system 40, only sensing system 30, or only response system 40.

Open field game arrangement 10 comprises one or more targets. A target disclosed herein may have a variety of shapes and sizes. Non-limiting examples of a target shape include a cylindrically shaped pylon, a circular-shaped dome, a square, a rectangle, a pyramid, an animal shape, and a cartoon character shape. In some embodiments, a target disclosed herein has at least one dimension that is at least three feet, such as, e.g., at least three feet in height, at least three feet in width, at least three feet in length, or any combination thereof or at least three feet in diameter. In some embodiments, a target disclosed herein can be 15 feet to 60 feet in diameter and up to ten feet tall. In some embodiments, a target disclosed herein can be 10 feet to 20 feet in diameter and up to 30 feet tall. In some embodiments, a target disclosed herein may have various images on them, such as circular stripes to create a bullseye, horizontal, vertical, or angular stripes, a number to indicate the score for that target, a star, an image of a person, place or thing, or other images, as desired.

A target disclosed herein can be a ground-based target as exemplified by FIGS. 3-11 or an air-based target as exemplified by FIG. 12. Additionally, a target disclosed herein can be a stationary target that is incapable of movement, a mobile target that can move around open field game arrangement 10, or a target having the capacity of being able to alternatively move around open field game arrangement 10 or remain stationary within it. In some embodiments, a target disclosed herein is a stationary, ground target secured to the ground at a specific position within open field game arrangement 10. In some embodiments, a target disclosed herein is a stationary, aerial target can be held aloft at a predetermined height, distance, and lateral position within open field game arrangement 10. In some embodiments, a target disclosed herein is a mobile, ground target is continuously moved in a fixed or random pattern to various distances and lateral positions within open field game arrangement 10. In some embodiments, a target disclosed herein is a mobile, aerial target held aloft and continuously moved in a fixed or random pattern to varying heights, distances, and lateral positions within open field game arrangement 10. In some embodiments, a target disclosed herein is a ground target that can alternate, either randomly or in a predetermined pattern, between being a stationary target or a mobile target. In some embodiments, a target disclosed herein is an aerial target that can alternate, either randomly or in a predetermined pattern, between being a stationary target or a mobile target. In some embodiments, a target disclosed herein is one capable of alternating, either randomly or in a predetermined pattern, between being a ground stationary target, an aerial stationary target, a ground mobile target, an aerial mobile target, or any combination thereof.

In some embodiments, a target disclosed herein can be made of a transparent or translucent shell or skin designed to allow light to pass through the transparent or translucent shell or skin. In some embodiments, a target disclosed herein comprising a shell or skin disclosed herein is made of a rigid material, preferably constructed in sections so it can be disassembled and consolidated for storage and transport. In some embodiments, a target disclosed herein comprising a shell or skin disclosed herein is made of a pliable material so it can be collapsed and be folded for storage and transport. A pliable material can be 6 mm to 30 mm in thickness. Exemplary pliable material includes, without limitation, a reinforced polyester, RHINOSKIN™ (INTERWRAP®) of Vancouver, Canada), a high strength geomembrane specifically engineered for heavy-duty liners and covers, and TYVEK® material (DUPONT™), a polyurethane coated ripstop nylon or polyester, or other materials. In embodiments where a target disclosed herein comprises a skin made from a pliable material; the target further includes an inflation system used to inflate the target in order to maintain its shape. In embodiments where a target disclosed herein comprises a skin made from a pliable material; the target further includes a support framework used to maintain the shape of target. Non-limiting examples of a support framework disclosed herein include rods made of fiberglass, metal, or other desirable material or inflatable tubes.

In some embodiments, a target disclosed herein is made of a transparent or translucent shell or skin comprises at least one light emitter 44 internal to the target that shines outwardly through the shell or skin, the light shining onto the inner surface of the shell or skin and through the shell or skin and out the outer surface of the shell or skin, which gives the shell or skin a glowing appearance. Light emitter 44 may include several lights 45 of various colors that can shine outwardly through the shell or skin and that can be selectively controlled to turn on and off individually as desired. These lights 45 may be part of response system 40 or be independent of such system. There also may be lights 45 shining onto the shell or skin from the outside of a target disclosed herein. As with the internal lights, these external lights may be part of response system 40 or be independent of such system. It is understood that, since a target disclosed herein can be made of a translucent or transparent shell or skin through which light can pass, a light shining on such a shell or skin will also shine through that shell or skin and that for a light to shine through a shell or skin, it first must shine on the shell or skin.

In some embodiments, and as shown in FIGS. 1 & 3A-3C, target 14 can be a stationary ground target that can be a pylon target 14A. Pylon target 14A is an inflatable target that has a cylindrically shaped skin 80, including a flat top and bottom and defines a hollow interior. Skin 80 is made of a pliable material that collapses and can be folded up for storage and transport but that keeps its shape when it is inflated. Skin 80 has an inflation port 82 with a sealable closure that is sealed shut when skin 80 is not being inflated. Air for inflation is added in the same manner as for an inflatable mattress, using an air pump or pressurized air canister to inject air through inflation port 82 until skin 80 is taut and then closing the inflation port 82. Skin 80 is sealed against the escape of air and so it does not require a constant air supply to remain inflated, but it may have to be re-inflated every few days to make sure the skin 80 remains taut. The bottom of skin 80 is transparent or includes a transparent window portion, which rests on the ground on top of a control system 20. One or more lights 45 of light emitter 44 are directed upwardly to shine through the transparent portion at the bottom of skin 80, onto the inner surface of skin 80, through skin 80, and out an outer surface of skin 80, as indicated by the broken lines radiating from control system 20 in FIG. 3A. Power is supplied to control system 20 using either a power cable 50 that passes underneath pylon target 14A to connect to control system 20 to a power source 52, or alternatively, power is supplied to control system 20 using battery power, which may eliminate the need for power cable 50. Pylon target 14A includes ears 84 secured to skin 80, through which tie-down cables 92 pass to secure pylon target 14A to the ground. Tie-down cables 92 may be secured to the ground using stakes driven into the ground, anchoring bolts attached to the ground, sandbags, water bags, or other ballast placed on the ground, or other known anchors. In some embodiments, pylon target 14A can be 10 feet to 20 feet in diameter and up to 30 feet tall. Pylon target 14A can be used with or without skirt target 14F or with or without flat target 14H.

Figure 4A:
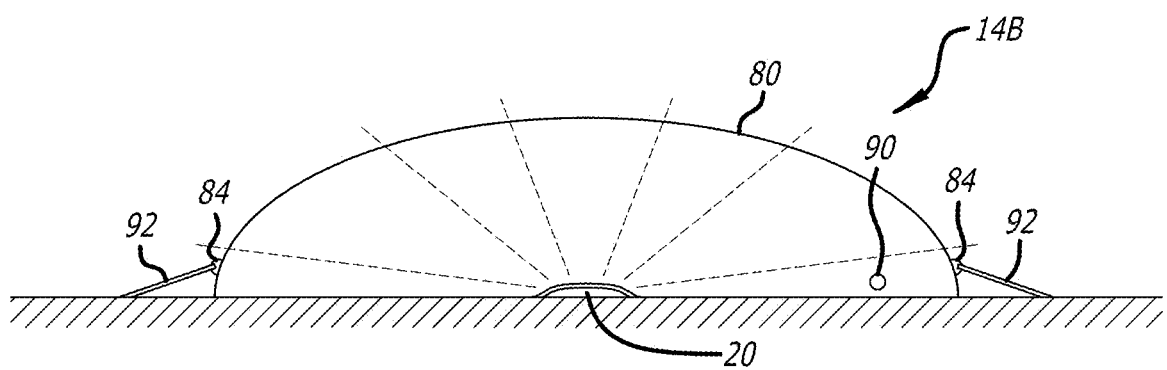
FIGS. 4A-4B illustrates a dome target disclosed herein with FIG. 4A showing a front schematic view of a dome target disclosed herein.
Figure 4B:
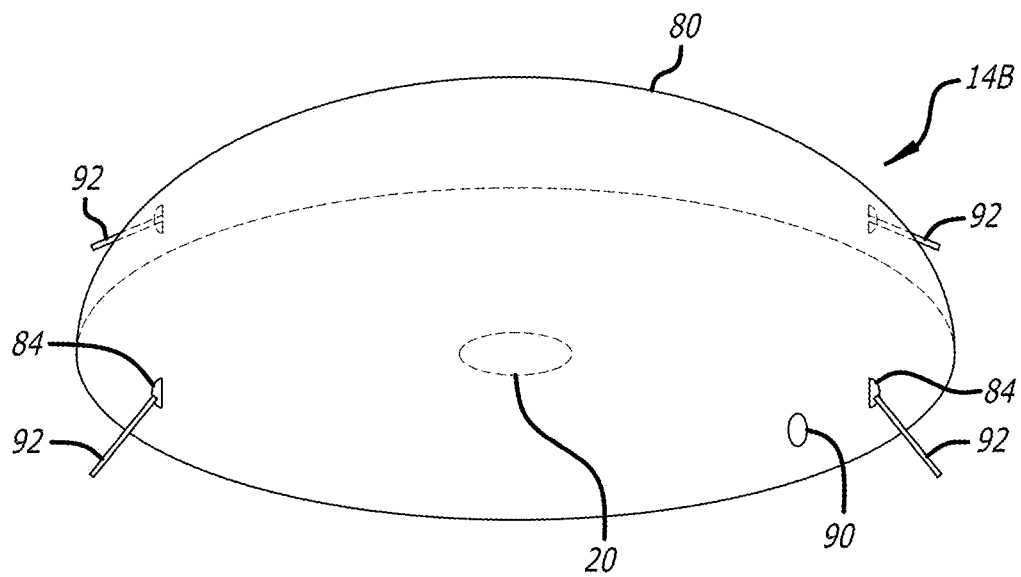

In some embodiments, and as shown in FIGS. 1 & 4A-4B, target 14 can be a stationary ground target that can be a dome target 14B. Dome target 14B is an inflatable target that has a translucent, dome-shaped skin 80, including a domed top and flat bottom and defines a hollow interior. Skin 80 is made of a pliable material that collapses and can be folded up for storage and transport but that keeps its shape when it is inflated. Skin 80 has an inflation port 82 with a sealable closure that is sealed shut when skin 80 is not being inflated. Air for inflation is added in the same manner as for an inflatable mattress, using an air pump or pressurized air canister to inject air through inflation port 82 until skin 80 is taut and then closing the inflation port 82. Skin 80 is sealed against the escape of air and so it does not require a constant air supply to remain inflated, but it may have to be re-inflated every few days to make sure the skin 80 remains taut. As with pylon target 14A, dome target 14B has a clear window on its bottom surface and rests on the ground with control panel 30 underneath dome target 14B. As described earlier with respect to pylon target 14A, control panel 30 has one or more lights 32 directed upwardly to shine through the clear window, through the interior of dome target 14B, onto the inner surface of skin 80, and then through skin 80. As with the previous embodiment, control system 20 comprises sensing system 30 and response system 40, and a power source 50. Power is supplied to control system 20 using either power cable 50 that passes underneath dome target 14B to connect to control system 20 to power source 52, or alternatively, power is supplied to control system 20 using battery power, which may eliminate the need for power cable 50. Dome target 14B includes ears 84 secured to skin 80, through which tie-down cables 92 pass to secure dome target 14B to the ground. Tie-down cables 92 may be secured to the ground using stakes driven into the ground, anchoring bolts attached to the ground, sandbags, water bags, or other ballast placed on the ground, or other known anchors. In some embodiments, dome target 14B can be 15 feet to 60 feet in diameter and up to 10 feet tall. Dome target 14B can be used with or without skirt target 14F or with or without flat target 14H.

Figure 5:
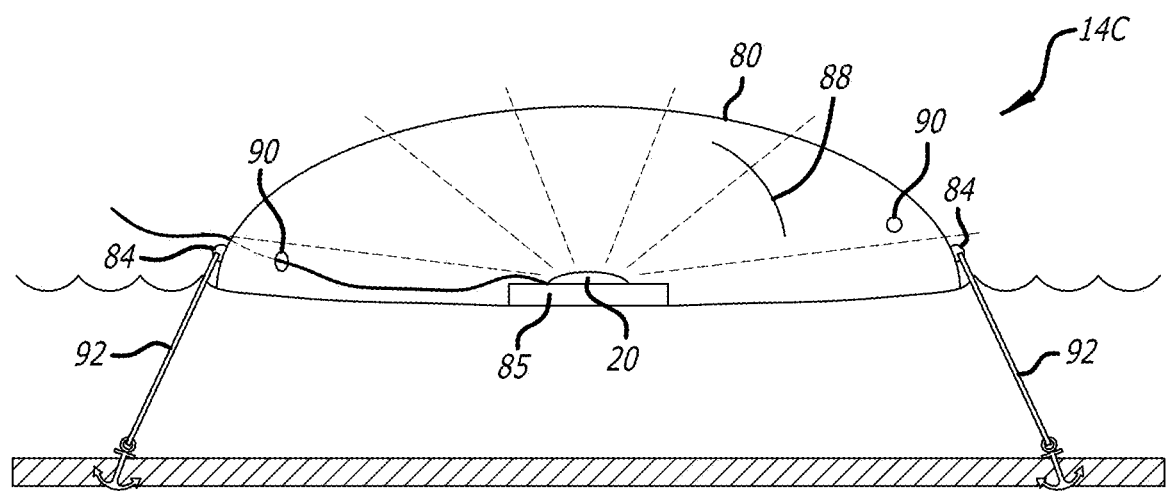
FIG. 5 illustrates a front view of a dome target disclosed herein position on a water feature of an open field game arrangement disclosed herein.

In some embodiments, and as shown in FIGS. 1 & 5, target 14 can be a stationary ground target that can be a floating dome target 14C. Floating dome target 14C is an inflatable target similar to dome target 14B except that skin 80 is waterproofed and this target floats on water and is anchored in placed by anchors secured to tie-down cables 92 secured to ears 84. Additionally, control system 20 comprising sensing system 30, response system 40, and power source 50 rests on top of a foam board 85, e.g., a polystyrene foam board (STYROFORM®, DUPONT®), which rests on top of the floor of skin 80. In order to insert control system 20 into the interior of the sealed skin 80, there is a zip lock opening 88 that is opened to insert control system 20 and foam board 85 and to connect control system 20 to power cable 50 and then is zipped closed to restore the sealed condition of floating dome target 14C. Zip lock opening 88 is similar to the zip lock on a sandwich bag, which creates an airtight and watertight seal. There also is a small power cable opening 90, through which power cable 50 passes to enter into the interior of floating dome target 14C. Power cable opening 90 has a gasket around its perimeter which seals against power cable 50 to maintain the air-tight, water-tight, sealed condition of floating dome target 14C. Alternatively, power is supplied to control system 20 using battery power, which may eliminate the need for power cable 50. Floating dome target 14C can be used with or without skirt target 14F or with or without flat target 14H.

In some embodiments, and as shown in FIGS. 1 & 6, target 14 can be a stationary ground target that can be a transparent dome target 14D. Transparent dome target 14D is an inflatable target that has a transparent, dome-shaped skin 80, including a domed top and flat bottom and defines a hollow interior. Skin 80 is made of a pliable material that collapses and can be folded up for storage and transport but that keeps its shape when inflated. Transparent dome target 14D is inflated using a continuous blower 54 and is configured to contain in its interior a car or other large object, which is kept inflated by the pressurized air being continually introduced by blower 54. Transparent dome target 14D has zipper openings 89, which are zipped open to insert the car (or other large object), as well as control system 20, and which then are zipped closed. Zipper openings 89 can be a regular toothed zipper similar to the types of zippers used on clothing. Although zipper openings 89 can leak air, the continuous introduction of air by blower 54 is sufficient to maintain skin 80 taut. One or more lights 45 of emitter 44 inside transparent dome target 14D are arrayed all around the bottom of skin 80 and are powered by power cable 50 which enters through power cable opening 90 with a gasket seal as described for dome target 14C. Transparent dome target 14D also has light emitter 44 comprising one or more lights 45 located outside of transparent dome target 14D and shine onto the outer surface of skin 80 and onto the car or other object contained therein. Transparent dome target 14D can be used with or without skirt target 14F or with or without flat target 14H.

Figure 7:
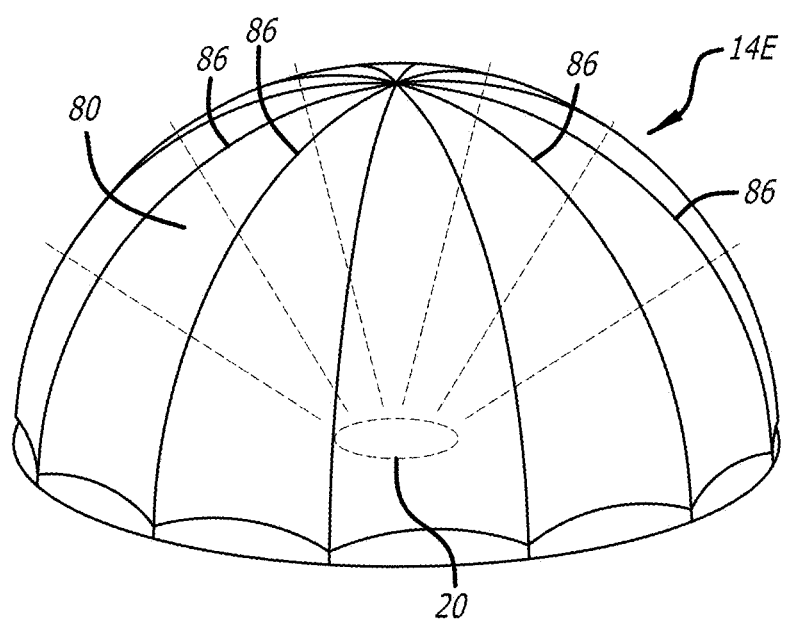
FIG. 7 illustrates a view of a pop-up dome target disclosed herein.
Figure 8:
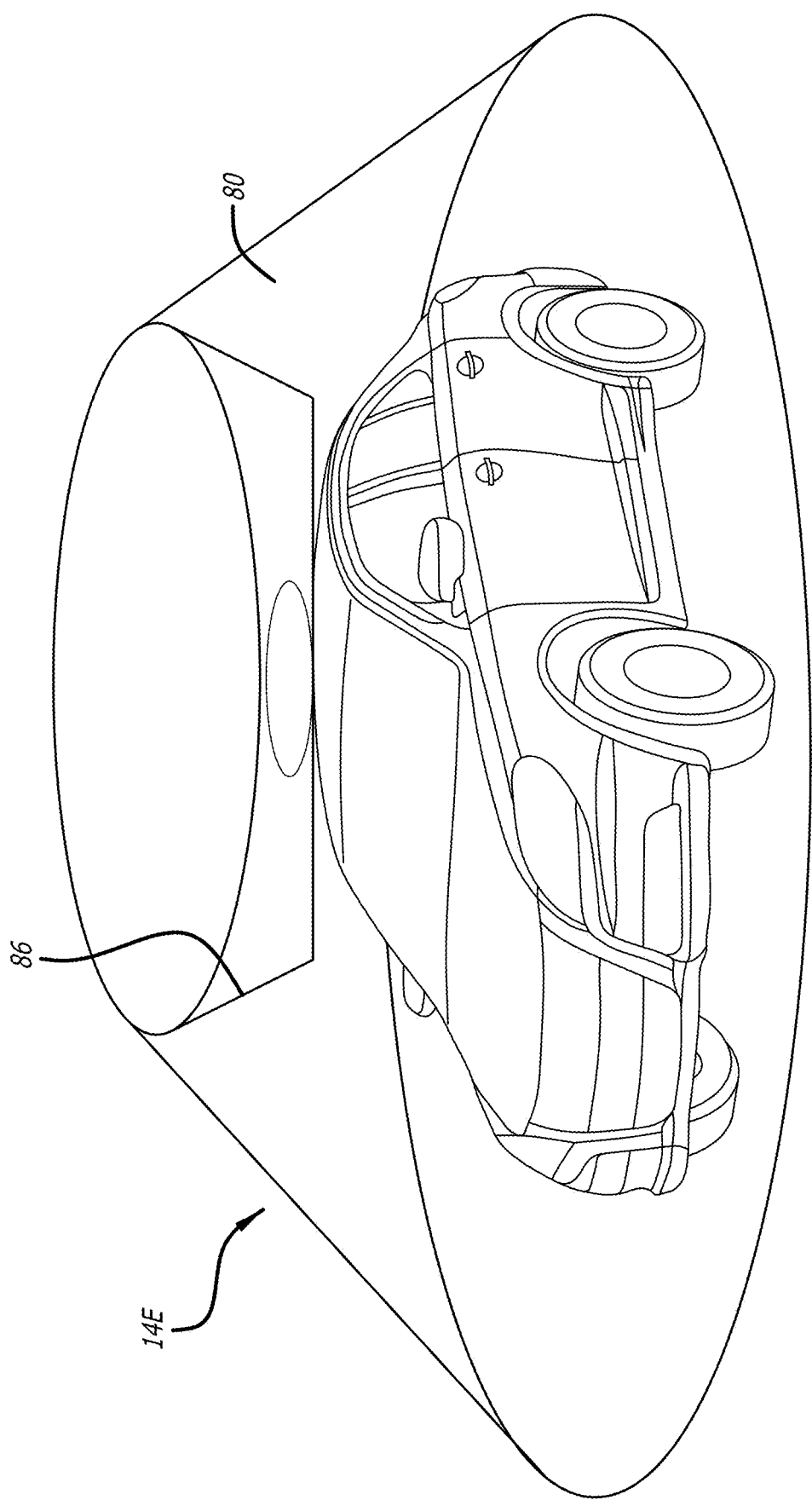
FIG. 8 illustrates a view of pop-up target disclosed herein.

In some embodiments, and as shown in FIGS. 1 & 7, target 14 can be a stationary ground target that can be a pop-up target 14E. Pop-up target 14E is a framework target having a dome-shaped skin 80 that defines a hollow interior. Skin 80 is made of a pliable material that collapses and can be folded up for storage and transport but keeps its shape when installed. Pop-up target 14E comprises a support framework including flexible ribs 86 to form a structure that supports and maintains the shape of skin 80, similar to a pop-up tent. Ribs 86 may be flexible rods made of fiberglass, metal, or other flexible material, or they may be inflated tubes. The bottom of pop-up target 14E is open, and control system 20 can rests on the ground on the interior of pop-up target 14E. In some embodiments, pop-up target 14E can be 15 feet to 60 feet in diameter and up to 10 feet tall. In some embodiments, and as shown in FIGS. 1 & 8, a stationary ground target can be a pop-up target 14E large enough to display a large object like a car. Pop-up target 14E can be used with or without skirt target 14F or with or without flat target 14H.

Figure 3A:
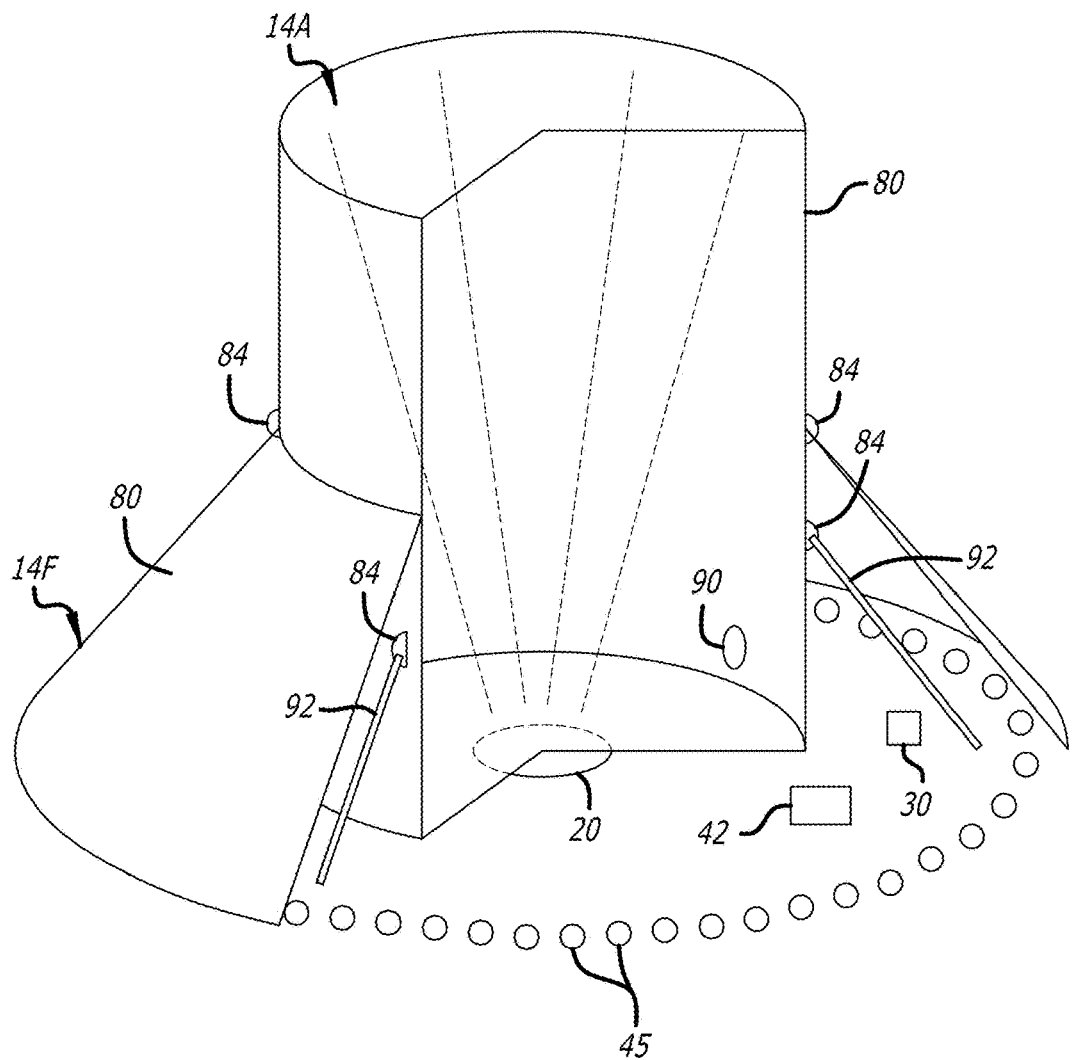
FIGS. 3A-3C illustrates a pylon target disclosed herein with FIG. 3A showing a cross-sectional view of a pylon target.
Figure 3B:
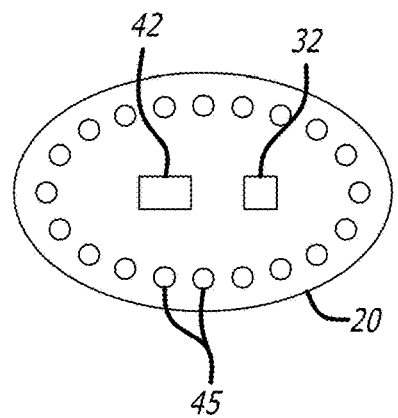
Figure 3C:
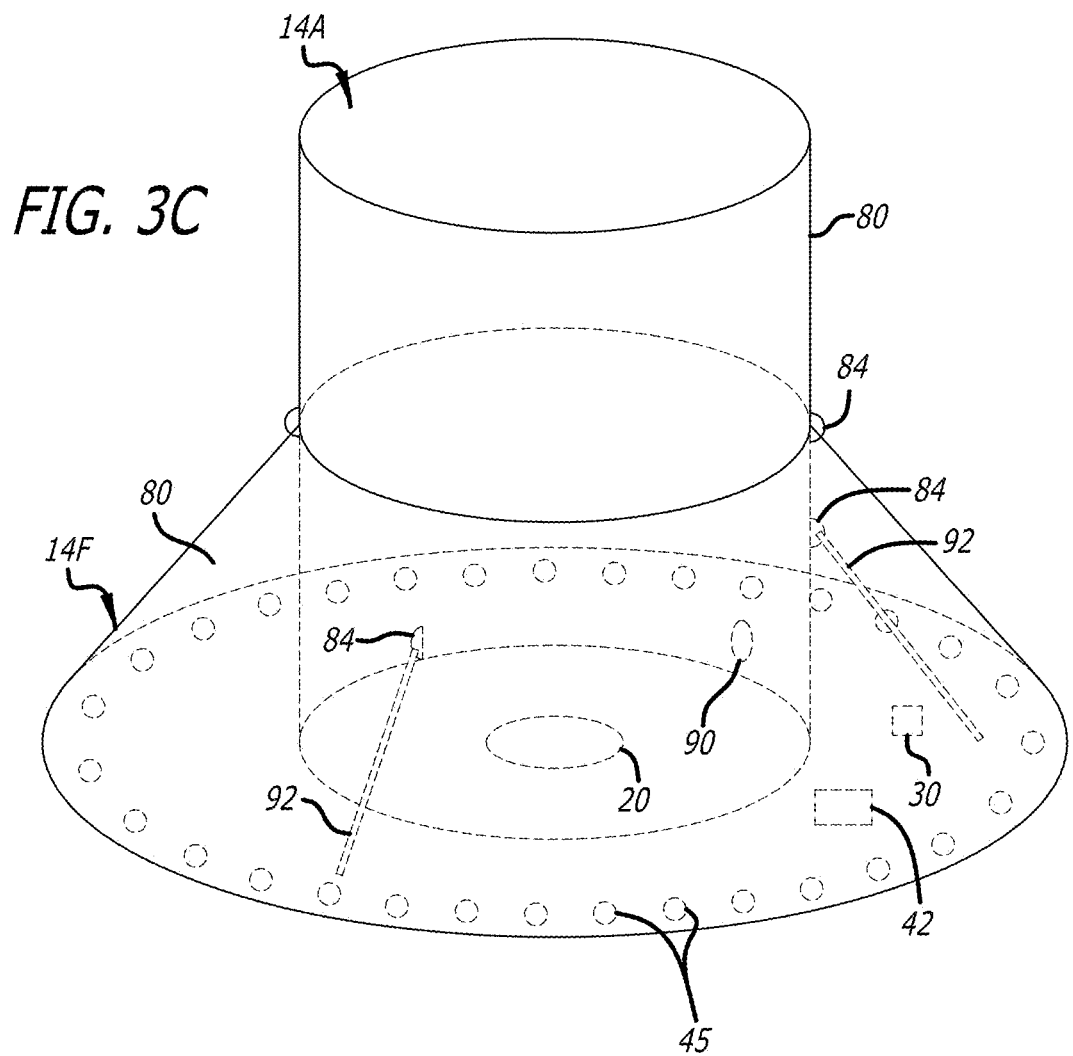

In some embodiments, and as shown in FIGS. 1, 3A, & 3C, target 14 can be a stationary ground target that can be a skirt target 14F. Skirt target 14F surround or hangs from another target 14. For example, as shown in FIGS. 1, 3A, & 3C, skirt target 14F can surround pylon target 14A or dome target 14B. In these embodiments, skirt target 14F is a tapered-shaped that has an upper edge secured to target 14, such as, e.g., pylon target 14A or dome target 14B, at a height above the ground and a lower edge that is secured to the ground at a diameter that is much larger than the diameter of target 14. The upper edge of skirt target 14F may be secured to target 14 in a variety of ways. The upper edge of skirt target 14F may be welded or sewn to target 14 in a manner that retains the air-tight nature of skin 80 of target 14. Alternatively, the upper edge of skirt target 14F may define a casing that receives a stiffening ring, and the casing or the stiffening ring may be secured to target 14 by a plurality of D-rings spaced around the perimeter of target 14 at a desired height above the ground. The stiffening ring (not shown) may be made of fiberglass rods with ends that nest like a fishing rod, or it may be made of PVC pipe with fittings, or metal pipe or tubing, or other desired materials. The lower edge of skirt target 14F may rest on the ground, and the lower edge can be secured to the ground in some known manner, such as by using a ballast such as sandbags or water bags or using D-rings spaced around the lower edge that are secured to the ground by tent stakes or other anchors. There may also be a stiffening ring in a casing at the bottom edge of skirt target 14F, if desired. Skirt target 14F is made of a skin of a similar foldable material that is open at the bottom and that defines a hollow interior. Control system 20 comprising sensing system 30 and response system 40 is installed inside the skin in order to detect and respond to a projectile. In some embodiments, skirt target 14F can be 20 feet to 100 feet in diameter.

Figure 11A:
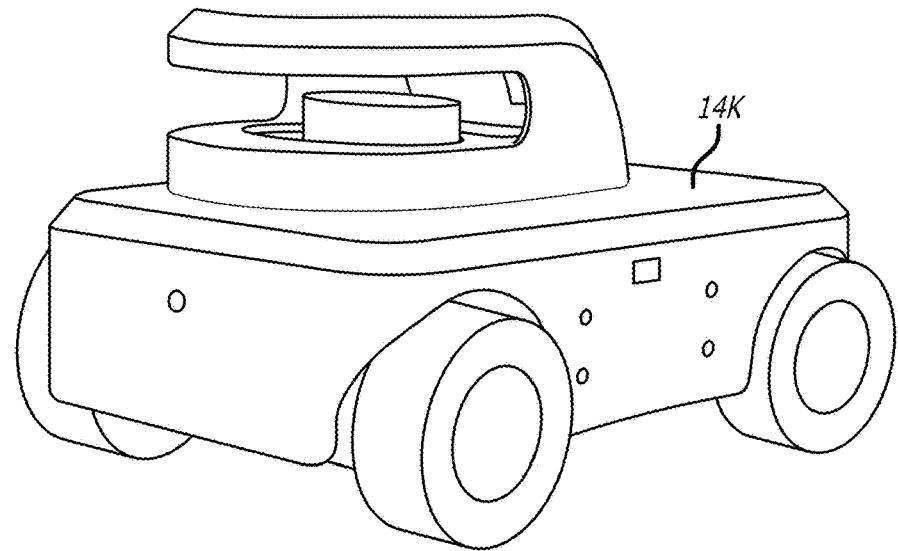
FIGS. 11A-11B illustrates an unmanned ground target disclosed herein with FIG. 11A showing a perspective view of an unmanned target disclosed herein and FIG. 11B showing a perspective view of an unmanned target disclosed herein.
Figure 11B:
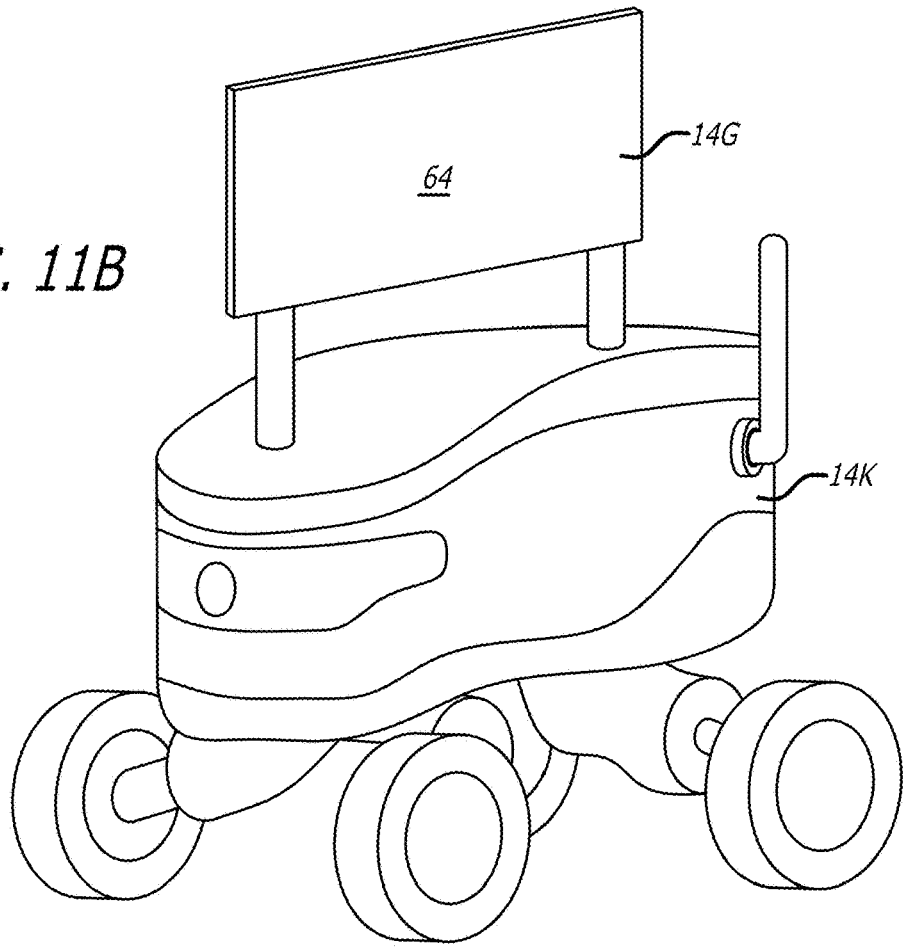
Figure 12A:
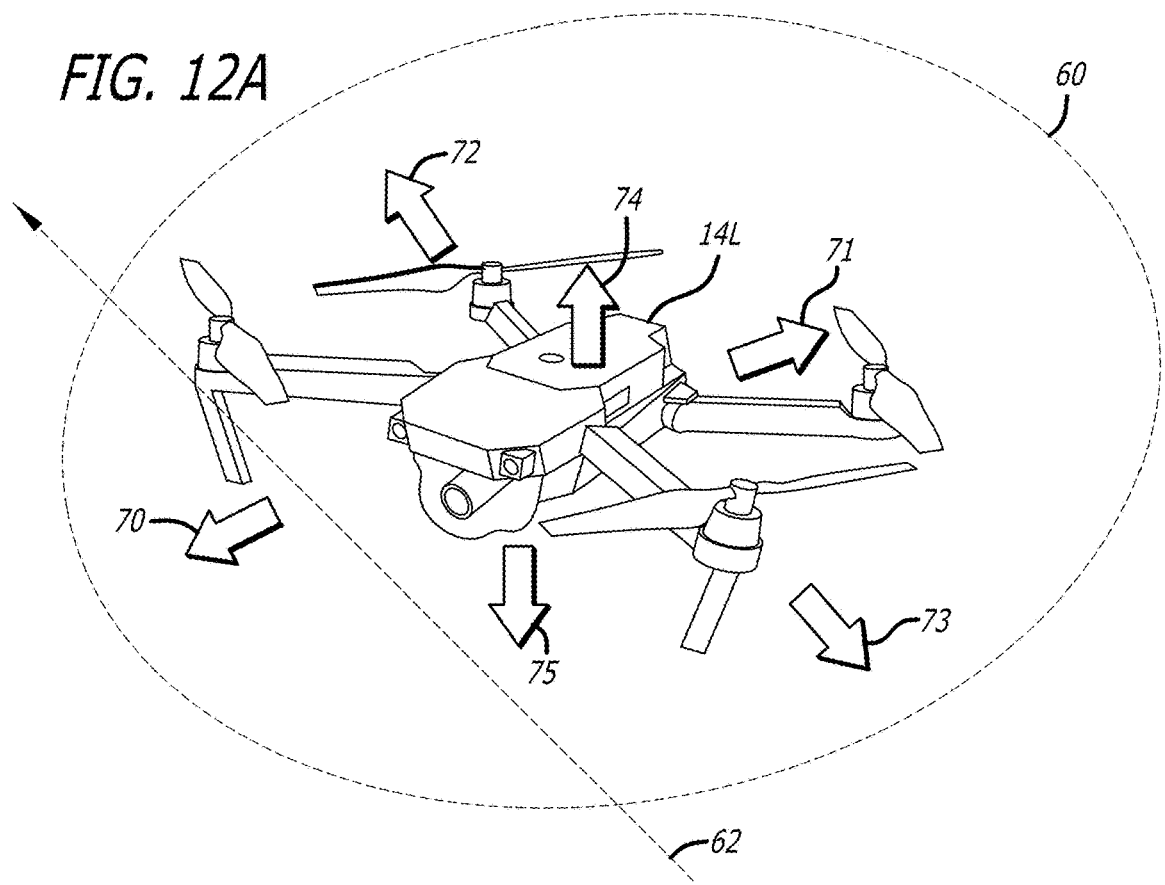
FIGS. 12A-12B illustrates an unmanned ariel target disclosed herein with FIG. 11A showing a perspective view of an unmanned ariel target disclosed herein and FIG. 11B showing a perspective view of an unmanned ariel target with a banner target disclosed herein.
Figure 12B:
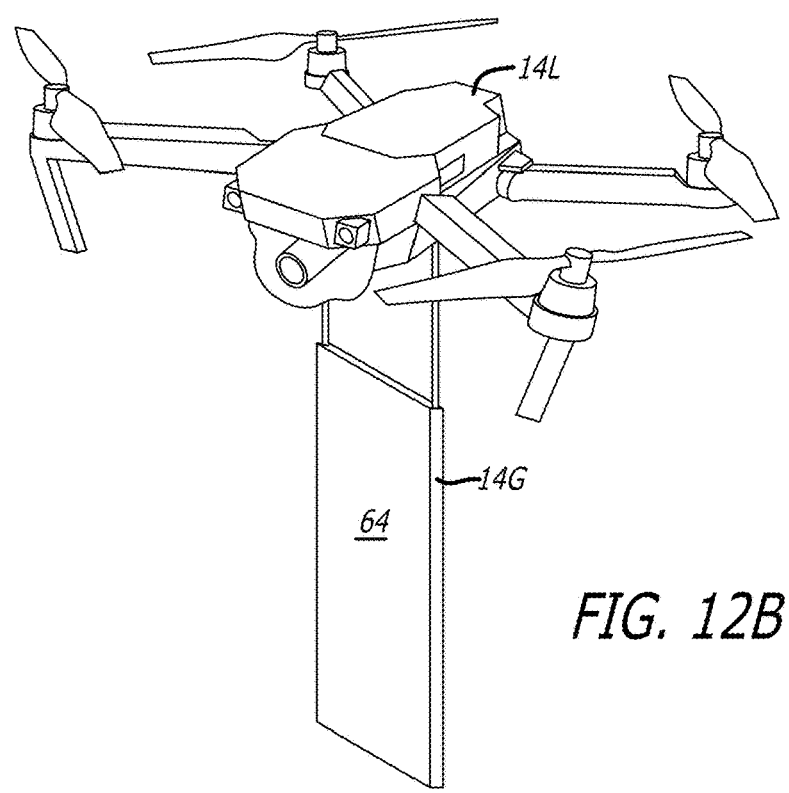

As another example, as shown in FIGS. 1, 11B, & 12B, skirt target 14F can be configured to form as a banner target 14G having a target surface 64. In some embodiments, skirt target 14F as banner target 14G can be displayed within open field arrangement 10, such as, e.g., along the length of open field arrangement 10, across the width of open field arrangement 10, or displayed in any other arrangement. In these embodiments, skirt target 14F as banner target 14G can include markings indicating the distance from launch area 12 (such as, e.g., 50 yards, 100 yards, 150 yards, 200 yards, 250 yards, 300 yards, and so forth). In some embodiments, skirt target 14F as banner target 14G can be hung, dragged, other otherwise secured to another target 14. For example, as shown in FIG. 11B, skirt target 14F as banner target 14G can be hung from unmanned aerial target 14K. Control system 20 comprising sensing system 30 and response system 40 is installed inside the skin in order to detect and respond to a projectile.

Figure 9:
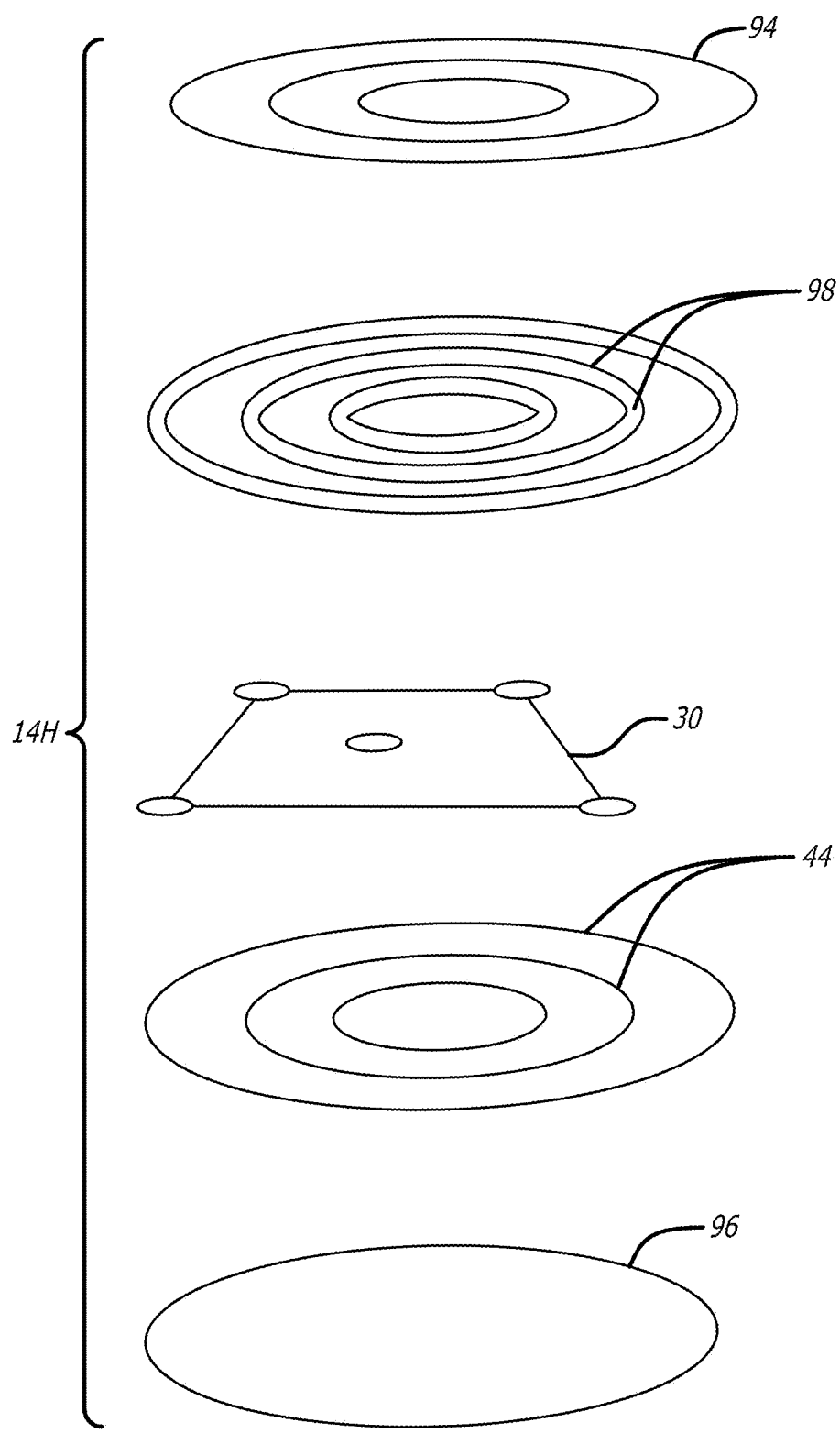
FIG. 9 illustrates an exploded perspective view of the flat target disclosed herein.

In some embodiments, and as shown in FIG. 9, target 14 can be a stationary ground target that can be a flat target 14H. Flat target 14H has top skin 94 and bottom skin 96. Top skin 60 has some rings that permit more light to pass through and some rings that permit less light to pass through, so some of the rings glow more than others. Sandwiched in between top skin 94 and bottom skin 96 are a plurality of ring-shaped, transparent bladders 98. The plurality of transparent bladders 98 are inflated to space top skin 94 a distance above bottom skin 96 and serves as the framework that defines the shape of top skin 94. Control system 20 comprises sensing system 30 and response system 40 is positioned below the plurality of transparent bladders 98. One or more lights 45 of light emitter 44 is configured as a light rope and formed into rings having the same general dimensions as the plurality of transparent bladders 98, so that the one or more light 45 shine upwardly through the plurality of transparent bladders 98 and through top skin 94. Sensing system 30 comprises sensors 32 which detect when top skin 94 is hit by a projectile. In this arrangement, flat target 14H can lie flat on top of the ground. Alternatively, a recess may be made in the ground, so that except top skin 94, flat target 14H lies within the recess, and top skin 94 is flush with the ground. Top and bottom skins 94, 96 are secured to the ground around their perimeters. In some embodiments, pylon target 14A or dome target 14B can be configured to project upwardly from the center of flat target 14H or next to this target and such targets can include lights that project onto the outside top skin 94.

In some embodiments, target 14 can be a stationary ground target that can be control system 20 comprising sensing system 30, response system 40, and power source 50. In some embodiments, sensing system 30 comprising sensor 32 and response system 40 comprising controller 42, light emitter 44 and/or sound generator 46 in order to detect and respond to a projectile strike to a target disclosed herein. In these embodiments, control system 20 is not associated with one or more targets 14. Instead, sensing system 30 comprising sensor 32 defines a detection field 60 which can be any 2-dimensional or 3-dimensional shape located about or around control system 20 or to an aside of or above control system 20. As such, detection field 60 established by control system 20 can cover a ground area surrounding control system 20, a ground area to one side of and not encompassing control system 20, a dome-shaped area covering a ground area surrounding control system 20 as well as an area above control system 20, a dome-shaped area covering a ground area to one side of and not encompassing control system 20 as well as an area above and to one side of and not encompassing control system 20, or an air space above control system 20 that does not encompass a ground area. In these embodiments, the air space defined by detection field 60 is target 14. In some embodiments, sensing system 30 comprising sensor 32 defines more than one detection field 60. In aspects of this embodiment, sensing system 30 comprising sensor 32 defines more than one air space as detection fields 60.

Detection field 60 generated by sensing system 30 comprising sensor 32 of control system 20 can be maintained in a constant position or a variable position. Detection field 60 also has the capability of moving in any direction including forward 70, backward 71, left 72, right 73, upward 74, and downward 75. In some embodiments, detection field 60 is a stationary detection field. For example, detection field 60 can be manually operated or automatically programed to remain stationary at a predetermined height, distance, and lateral position within open field game arrangement 10. In some embodiments, detection field 60 is a mobile detection field. For example, detection field 60 can be manually operated or automatically programed to move continuously in a fixed or random pattern to varying heights, distances, and lateral positions within open field game arrangement 10. In some embodiments, detection field 60 can alternate, either randomly or in a predetermined pattern, between being a stationary detection field or a mobile detection field. In some embodiments, detection field 60 is one capable of alternating, either randomly or in a predetermined pattern, between being a ground stationary detection field, an aerial, stationary detection field, an aerial mobile detection field, or any combination thereof.

Figure 10:
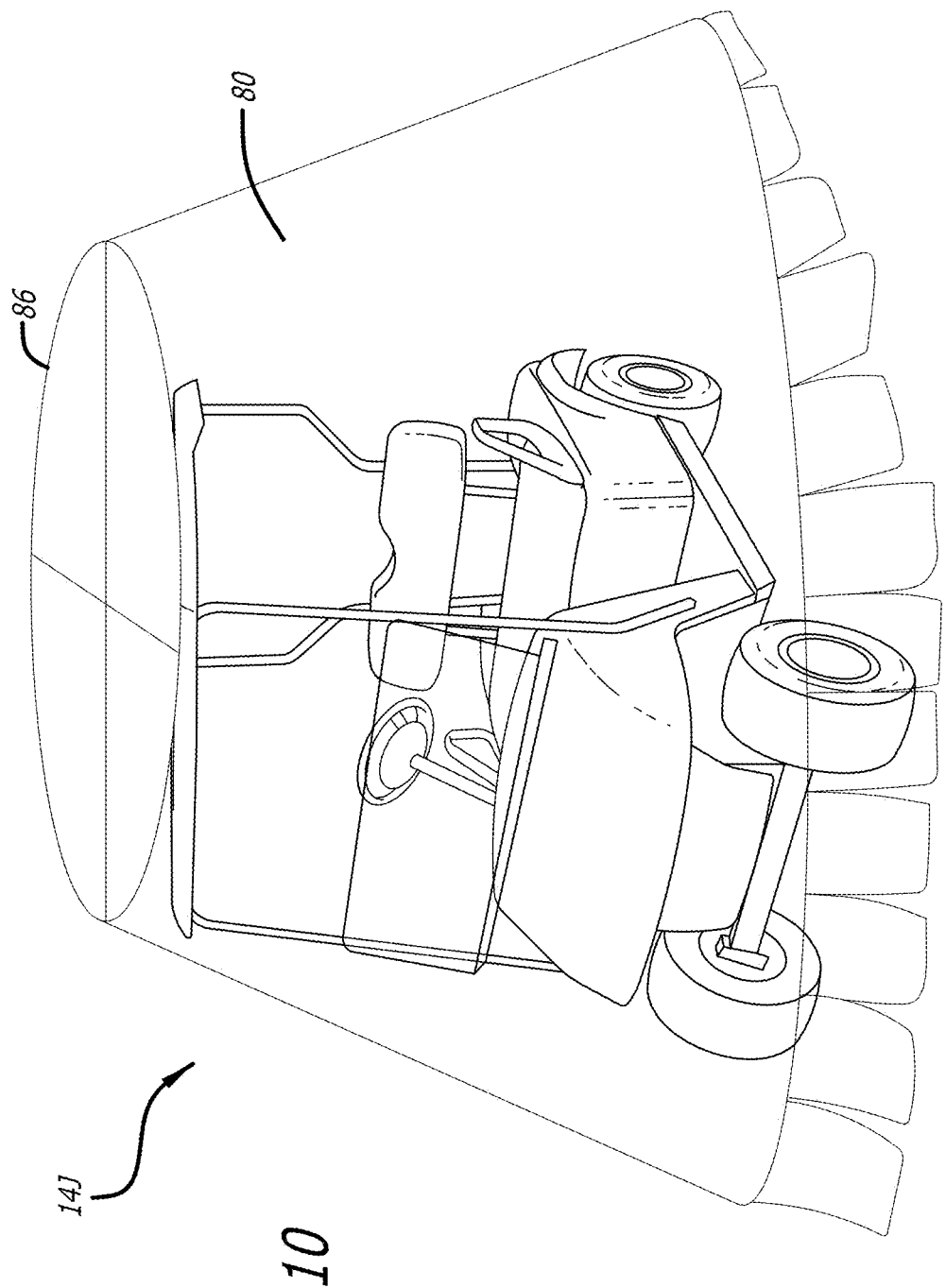
FIG. 10 illustrates a perspective view of a mobile ground target disclosed herein.

In some embodiments, and as shown in FIG. 10, target 14 can be a mobile ground target 14J. In some embodiments, mobile ground target 14J is a vehicle to which a support framework comprising ribs 86 and skin 80 that defines a hollow interior is secured to the vehicle in a manner where ribs 86 of the support framework mounts to the top of the vehicle, and skin 80 drapes over the framework. In some embodiments, a flexible skirt secured to the bottom of skin 80, which allows the skirt to drag along the ground when the target 14J is travelling, thereby preventing harm to skin 80 of mobile ground target 14J. In some embodiments, mobile ground target 14J comprises control system 20 comprising sensing system 30 and response system 40 is installed on the vehicle inside the skin in order to detect and respond to a projectile. In some embodiments, a mobile ground target 14J is one capable of alternating, either randomly or in a predetermined pattern, between being a ground stationary target, a ground mobile target, or any combination thereof. In some embodiments, a vehicle disclosed herein is a golf cart.

Target 14 can also be an unmanned vehicle such as, e.g., a remote-controlled vehicle, an autonomous or self-directed vehicle, and the like. In some embodiments, an unmanned vehicle is an autonomous or self-directed vehicle that does not require human intervention to operate as programmed. In some embodiments, an unmanned vehicle can be about 1 foot to about 8 feet in its longest dimension. In some embodiments, an unmanned vehicle can be about 4 feet to about 8 feet in its longest dimension and serve as target 14. In these embodiments, an unmanned vehicle can be coated with a protective material to prevent or reduce damage when a projectile strikes the unmanned vehicle. In some embodiments, an unmanned vehicle can be about 1 foot to about 3 feet in its longest dimension and the target is a detection field disclosed herein, such as a detection field 60 generated by the unmanned vehicle. In some embodiments, an unmanned vehicle disclosed herein is an unmanned ground target. In some embodiments, an unmanned vehicle disclosed herein is an unmanned aerial target.

In some embodiments, an unmanned vehicle disclosed herein can be controlled or programed to act independently from other unmanned vehicles disclosed herein in an open field game arrangement disclosed herein. In some embodiments, an unmanned vehicle disclosed herein can be controlled or programed to act in a coordinated fashion with other unmanned vehicles disclosed herein to create an unmanned vehicle swarm in an open field game arrangement disclosed herein. In aspects of these embodiments, two or more unmanned vehicles disclosed herein can be controlled or programed to coordinate their movements to move in unison so that all move in the same direction at the same time. In aspects of these embodiments, two or more unmanned vehicles disclosed herein can be controlled or programed to coordinate their movements so that a first subset of unmanned vehicles move in the same direction at the same time while a second subset of unmanned vehicles move in the same direction at the same time, with such coordinated movement being different than the first subset in some aspect, such as, e.g., direction, time, or both direction or time. Such coordinated movement can be more complex to create a plurality of orchestrated pattern of movements from a plurality on unmanned vehicles.

In some embodiments, a controlled or programed coordinated pattern of movement of unmanned vehicles disclosed herein can be orchestrated using, e.g., at least 2 subsets of unmanned vehicles, at least 3 subsets of unmanned vehicles, at least 4 subsets of unmanned vehicles, at least 5 subsets of unmanned vehicles, at least 6 subsets of unmanned vehicles, at least 7 subsets of unmanned vehicles, at 8 eight subsets of unmanned vehicles, at least 9 subsets of unmanned vehicles, or at least 10 subsets of unmanned vehicles. In some embodiments, a controlled or programed coordinated pattern of movement of unmanned vehicles disclosed herein can be orchestrated using, e.g., about 2 to about 3 subsets of unmanned vehicles, about 2 to about 4 subsets of unmanned vehicles, about 2 to about 5 subsets of unmanned vehicles, about 2 to about 6 subsets of unmanned vehicles, about 2 to about 7 subsets of unmanned vehicles, about 2 to about 8 subsets of unmanned vehicles, about 2 to about 9 subsets of unmanned vehicles, about 2 to about 10 subsets of unmanned vehicles, about 3 to about 4 subsets of unmanned vehicles, about 3 to about 5 subsets of unmanned vehicles, about 3 to about 6 subsets of unmanned vehicles, about 3 to about 7 subsets of unmanned vehicles, about 3 to about 8 subsets of unmanned vehicles, about 3 to about 9 subsets of unmanned vehicles, about 3 to about 10 subsets of unmanned vehicles, about 4 to about 5 subsets of unmanned vehicles, about 4 to about 6 subsets of unmanned vehicles, about 4 to about 7 subsets of unmanned vehicles, about 4 to about 8 subsets of unmanned vehicles, about 4 to about 9 subsets of unmanned vehicles, about 4 to about 10 subsets of unmanned vehicles, about 5 to about 6 subsets of unmanned vehicles, about 5 to about 7 subsets of unmanned vehicles, about 5 to about 8 subsets of unmanned vehicles, about 5 to about 9 subsets of unmanned vehicles, about 5 to about 10 subsets of unmanned vehicles, about 6 to about 7 subsets of unmanned vehicles, about 6 to about 8 subsets of unmanned vehicles, about 6 to about 9 subsets of unmanned vehicles, about 6 to about 10 subsets of unmanned vehicles, about 7 to about 8 subsets of unmanned vehicles, about 7 to about 9 subsets of unmanned vehicles, about 7 to about 10 subsets of unmanned vehicles, about 8 to about 9 subsets of unmanned vehicles, about 8 to about 10 subsets of unmanned vehicles, or about 9 to about 10 subsets of unmanned vehicles.

In some embodiments, a subset of unmanned vehicles disclosed herein controlled or programed to act in a coordinated fashion with other unmanned vehicles disclosed herein to create an unmanned vehicle swarm, e.g., 1 or more unmanned vehicles, 2 or more unmanned vehicles, 3 or more unmanned vehicles, 4 or more unmanned vehicles, 5 or more unmanned vehicles, 6 or more unmanned vehicles, 7 or more unmanned vehicles, 8 or more unmanned vehicles, 9 or more unmanned vehicles, or 10 or more unmanned vehicles. In some embodiments, a subset of unmanned vehicles disclosed herein controlled or programed to act in a coordinated fashion with other unmanned vehicles disclosed herein to create an unmanned vehicle swarm, e.g., about 2 to about 3 unmanned vehicles, about 2 to about 4 unmanned vehicles, about 2 to about 5 unmanned vehicles, about 2 to about 6 unmanned vehicles, about 2 to about 7 unmanned vehicles, about 2 to about 8 unmanned vehicles, about 2 to about 9 unmanned vehicles, about 2 to about 10 unmanned vehicles, about 3 to about 4 unmanned vehicles, about 3 to about 5 unmanned vehicles, about 3 to about 6 unmanned vehicles, about 3 to about 7 unmanned vehicles, about 3 to about 8 unmanned vehicles, about 3 to about 9 unmanned vehicles, about 3 to about 10 unmanned vehicles, about 4 to about 5 unmanned vehicles, about 4 to about 6 unmanned vehicles, about 4 to about 7 unmanned vehicles, about 4 to about 8 unmanned vehicles, about 4 to about 9 unmanned vehicles, about 4 to about 10 unmanned vehicles, about 5 to about 6 unmanned vehicles, about 5 to about 7 unmanned vehicles, about 5 to about 8 unmanned vehicles, about 5 to about 9 unmanned vehicles, about 5 to about 10 unmanned vehicles, about 6 to about 7 unmanned vehicles, about 6 to about 8 unmanned vehicles, about 6 to about 9 unmanned vehicles, about 6 to about 10 unmanned vehicles, about 7 to about 8 unmanned vehicles, about 7 to about 9 unmanned vehicles, about 7 to about 10 unmanned vehicles, about 8 to about 9 unmanned vehicles, about 8 to about 10 unmanned vehicles, or about 9 to about 10 unmanned vehicles.

In some embodiments, and as shown in FIGS. 11A & 11B, target 14 can be an unmanned target disclosed herein is an unmanned ground vehicle such as, e.g., a remote-controlled ground vehicle, an autonomous or self-directed ground vehicle, and the like. In some embodiments, target 14 can be an unmanned ground vehicle that serves as an unmanned ground target 14K. In some embodiments, target 14 can be an unmanned ground vehicle such as unmanned ground target 14K where detection field 60 serves as a target disclosed herein. In some embodiments, control system 20 comprising sensing system 30 and response system 40 is installed inside unmanned ground target 14K in order to detect and respond to a projectile strike to a target disclosed herein. Sensing system 30 comprising sensor 32 defines detection field 60 which can be any 2-dimensional or 3-dimensional shape located about or around unmanned ground target 14K or to an aside of or above mobile ground target 14K. As such, detection filed 60 established by unmanned ground target 14K can cover a ground area surrounding unmanned ground target 14K, a ground area to one side of and not encompassing unmanned ground target 14K, a dome-shaped area covering a ground area surrounding as well as an area above unmanned ground target 14K, a dome-shaped area covering a ground area as well as an area above to one side of and not encompassing unmanned ground target 14K, or an air space that does not encompass a ground area.

In some embodiments, where sensing system 30 comprising sensor 32 defines detection field 60 about or unmanned ground target 14K, then unmanned ground target 14K is a target as disclosed herein. In some embodiments, where sensing system 30 comprising sensor 32 defines detection field 60 to an aside of or above unmanned ground target 14K, then unmanned ground target 14K is not a target as disclosed herein; instead, the air space defined by detection field 60 is a target as disclosed herein. In some embodiments, sensing system 30 comprising sensor 32 defines more than one detection field 60. In aspects of this embodiment, sensing system 30 comprising sensor 32 defines more than one air space as detection fields 60. In other aspects of this embodiment, sensing system 30 comprising sensor 32 defines one or more air space as well as unmanned ground target 14K as detection fields 60.

Detection field 60 generated by sensing system 30 comprising sensor 32 of unmanned ground target 14K can be maintained in a constant position or a variable position. Detection field 60 also has the capability of moving in any direction including forward 70, backward 71, left 72, right 73, upward 74, and downward 75. In some embodiments, detection field 60 is a stationary detection field. For example, detection field 60 can be manually operated or automatically programed to remain stationary at a predetermined height, distance, and lateral position within open field game arrangement 10. In some embodiments, detection field 60 is a mobile detection field. For example, detection field 60 can be manually operated or automatically programed to move continuously in a fixed or random pattern to varying heights, distances, and lateral positions within open field game arrangement 10. In some embodiments, detection field 60 can alternate, either randomly or in a predetermined pattern, between being a stationary detection field or a mobile detection field. In some embodiments, detection field 60 is one capable of alternating, either randomly or in a predetermined pattern, between being a ground stationary detection field, an aerial, stationary detection field, an aerial mobile detection field, or any combination thereof.

Unmanned ground target 14K can be maintained in a constant position or a variable position. Unmanned ground target 14K also has the capability of moving in any direction along the ground including forward 70, backward 71, left 72, and right 73. In some embodiments, unmanned ground target 14K is capable of being a stationary ground target. For example, unmanned ground target 14K can be manually operated or automatically programed to remain stationary at a predetermined distance, and lateral position within open field game arrangement 10. In some embodiments, unmanned ground target 14K is capable of being a moving ground target. For example, unmanned ground target 14K can be manually operated or automatically programed to move continuously in a fixed or random pattern to varying heights, distances, and lateral positions within open field game arrangement 10. In some embodiments, unmanned ground target 14K is a ground target that can alternate, either randomly or in a predetermined pattern, between being a stationary ground target or a moving ground target. In some embodiments, unmanned ground target 14K can be controlled or programed to act in a coordinated fashion with other unmanned vehicles disclosed herein, such as one or more unmanned ground target 14K, to create an unmanned vehicle swarm as disclosed herein in an open field game arrangement disclosed herein.

In some embodiments, unmanned ground target 14K can include tracking system 35 capable of tracking a projectile to determine whether a projectile is positioned within a detection field at any point along a projectile path 80. Non-limiting tracking systems include an integrated radar, a lidar, a sound sensing, a camera tracking, and other tracking technologies. Tracking data and/or sensor data can be wirelessly communicated between unmanned ground target 14K and the control center 42 (or other computing system) to generate a response such as, e.g., a light effect, a sound effect, a smoke effect, a scoring event, or other preprogrammed responses to a particular event.

In some embodiments, and as shown in FIGS. 12A & 12B, an unmanned target disclosed herein is an unmanned aerial vehicle such as, e.g., a remote-controlled aerial vehicle, an autonomous or self-directed aerial vehicle, and the like. In some embodiments, target 14 can be an unmanned ground vehicle that serves as an unmanned aerial target 14L. In some embodiments, target 14 can be an unmanned ground vehicle such as unmanned aerial target 14L where detection field 60 serves as a target disclosed herein. In some embodiments, control system 20 comprising sensing system 30 and response system 40 is installed inside unmanned aerial target 14L in order to detect and respond to a projectile strike to a target disclosed herein. Sensing system 30 comprising sensor 32 defines detection field 60 which can be any 2-dimensional or 3-dimensional shape located about or around unmanned aerial target 14L or to an aside of unmanned aerial target 14L. In some embodiments, where sensing system 30 comprising sensor 32 defines detection field 60 about or around unmanned aerial target 14L, then unmanned aerial target 14L is a target as disclosed herein. In some embodiments, where sensing system 30 comprising sensor 32 defines detection field 60 to an aside of unmanned aerial target 14L, then unmanned aerial target 14L is not a target as disclosed herein; instead, the air space defined by detection field 60 is a target as disclosed herein. In some embodiments, sensing system 30 comprising sensor 32 defines more than one detection field 60. In aspects of this embodiment, sensing system 30 comprising sensor 32 defines more than one air space as detection fields 60. In other aspects of this embodiment, sensing system 30 comprising sensor 32 defines one or more air space as well as unmanned aerial target 14L as detection fields 60.

Detection field 60 generated by sensing system 30 comprising sensor 32 of unmanned aerial target 14L can be maintained in a constant position or a variable position. Detection field 60 also has the capability of moving in any direction including forward 70, backward 71, left 72, right 73, upward 74, and downward 75. In some embodiments, detection field 60 is a stationary detection field. For example, detection field 60 can be manually operated or automatically programed to remain stationary at a predetermined height, distance, and lateral position within open field game arrangement 10. In some embodiments, detection field 60 is a mobile detection field. For example, detection field 60 can be manually operated or automatically programed to move continuously in a fixed or random pattern to varying heights, distances, and lateral positions within open field game arrangement 10. In some embodiments, detection field 60 can alternate, either randomly or in a predetermined pattern, between being a stationary detection field or a mobile detection field. In some embodiments, detection field 60 is one capable of alternating, either randomly or in a predetermined pattern, between being a ground stationary detection field, an aerial, stationary detection field, an aerial mobile detection field, or any combination thereof.

In some embodiments, and as shown in FIG. 12B, unmanned aerial target 14L further comprises banner target 14G with a target surface 64 and control system 20 comprising sensing system 30 and response system 40 installed inside unmanned aerial target 14L in order to detect and respond to a projectile strike to a target disclosed herein. In some embodiments, sensing system 30 comprising sensor 32 defines detection field 60 about or around banner target 14G. In some embodiments, sensing system 30 comprising sensor 32 defines detection field 60 about or around banner target 14G and about or around unmanned aerial target 14L. In some embodiments, sensing system 30 comprising sensor 32 defines detection field 60 about or around banner target 14G as well as defining one or more air space as detection fields 60. In some embodiments, sensing system 30 comprising sensor 32 defines detection field 60 about or around banner target 14G, about or around unmanned aerial target 14L as well as defining one or more air space as detection fields 60.

Unmanned aerial target 14L can be maintained in a constant position (or within several feet of a set position, at a height h off the ground, depending on atmospheric conditions, such as wind, etc.) or a variable position. Unmanned aerial target 14L also has the capability of moving in any direction including forward 70, backward 71, left 72, right 73, upward 74, and downward 75. In some embodiments, unmanned aerial target 14L is a stationary aerial target. For example, unmanned aerial target 14L can be manually operated or automatically programed to remain stationary at a predetermined height, distance, and lateral position within open field game arrangement 10. In some embodiments, unmanned aerial target 14L is a mobile aerial target. For example, unmanned aerial target 14L can be manually operated or automatically programed to move continuously in a fixed or random pattern to varying heights, distances, and lateral positions within open field game arrangement 10. In some embodiments, unmanned aerial target 14L is an aerial target that can alternate, either randomly or in a predetermined pattern, between being a stationary aerial target or a mobile aerial target. In some embodiments, unmanned aerial target 14L is one capable of alternating, either randomly or in a predetermined pattern, between being a ground stationary target, an aerial, stationary target, an aerial mobile target, or any combination thereof. In some embodiments, unmanned aerial target 14L can be controlled or programed to act in a coordinated fashion with other unmanned vehicles disclosed herein, such as one or more unmanned ground targets 14K, one or more unmanned aerial targets 14L, or any combination thereof, to create an unmanned vehicle swarm as disclosed herein in an open field game arrangement disclosed herein.

In some embodiments, unmanned aerial target 14L can include tracking system 35 capable of tracking a projectile to determine whether a projectile is positioned within detection field 60 at any point along projectile path 80. Non-limiting tracking systems include an integrated radar, a lidar, a sound sensing, a camera tracking, and other tracking technologies. Tracking data and/or sensor data can be wirelessly communicated between unmanned aerial target 14L and control center 42 (or other computing system) to generate a response such as, e.g., a light effect, a sound effect, a smoke effect, a scoring event, or other preprogrammed responses to a particular event.

A projectile disclosed herein is any object that can be launched or otherwise sent toward a target disclosed herein in an effort to hit the target with the projectile. Various types of projectiles may be used to hit a target disclosed herein including without limitation a ball, a paintball, a bullet, a rubber bullet, an arrow, a soft-tipped arrow, an axe, a rubber coated axe, a frisbee, or various other types of user-controlled projectiles that can be launched by a user either by the user throwing, kicking or otherwise launching the projectile using a body part, or by the user using a device to launch the projectile such as, e.g., a gold club, a bat, a paddle, a firearm, or a bow. In some embodiments, a projectile is a ball such as, e.g., a golf ball, a football, or a soccer ball. A projectile disclosed herein may be or be made to glow in the dark, using known technology, so they can be seen in the dark. For example, a projectile may have an outer skin or coating comprising 50% strontium aluminate skin to make them glow in the dark, and when activated with a suitable dopant, such as europium or dysprosium, the strontium aluminate acts as a photoluminescent phosphor with a long persistence of phosphorescence. As another example, a projectile may have an outer skin or coating comprising a photoluminescent pigment that is activatable with a UV light source. As yet another example, a projectile can be LED powered projectile. In that manner, a user and spectators can watch the projectiles travelling from launch area 12 to target 14 in the dark. Additionally, if a tracking system disclosed herein is present to track the projectiles, that tracking system also may take advantage of the glowing projectile to be able to track the projectile in the dark. In some embodiments, a projectile disclosed herein can be associated with a unique user, either by a tracking system disclosed herein determining the origination spot of a projectile, by uniquely identifying each projectile visually or through a computer readable identifier or the like controlled, for example, by a scoring kiosk 18.

Figure 13:
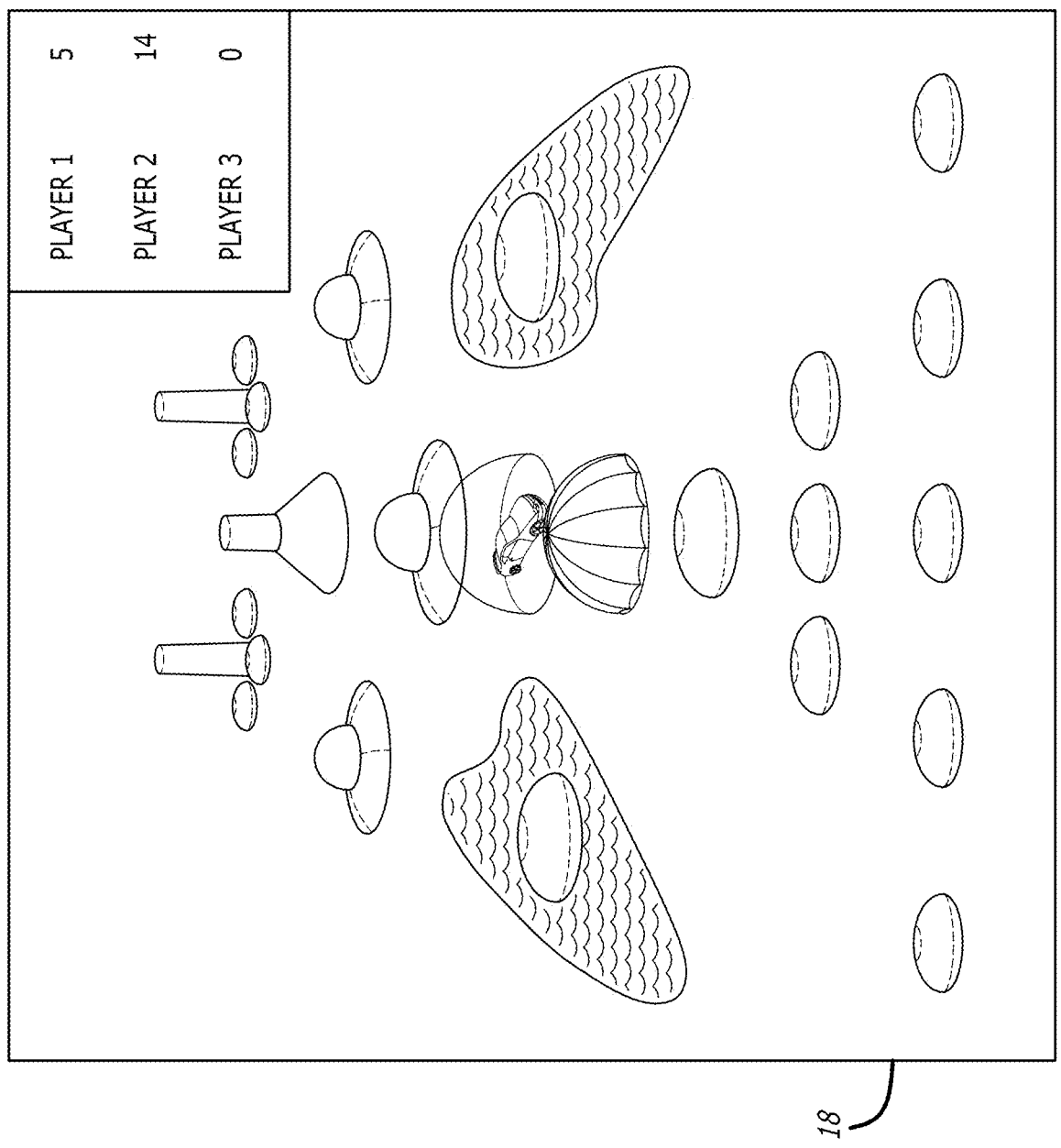
FIG. 13 is a plan view of a scoring kiosk disclosed herein.

In some embodiments, and as shown in FIG. 1, open field game arrangement 10 comprises launch area 12 used by a user to launch or otherwise send a projectile with a desire to hit a particular target 14 contained in open field game arrangement 10. Non-limiting examples of launch area 12 include a tee area, a shooting line, or any other designated area where a user can launch a projectile disclosed herein. Launch area 12 can comprise one or more dividers 16, which separate launch area 12 into a plurality of lanes 17. Each lane 17 can comprise a scoring kiosk 18, where a user in the respective lane 17 can keep score. As shown in FIG. 13, scoring kiosk 18 can include a touch screen showing a display of the targets arranged in the same manner as they are arranged on open field game arrangement 10. When a user launches a projectile that hits target 14, controller 42 is programed to generate a score based on a scoring system disclosed herein and communicate this score to scoring kiosk 18 where the score is displayed on the screen. Open field game arrangement 10 includes speakers 19 located in launch area 12 so a user in launch area 12 can hear sounds generated from control system 20. There may be additional speakers 19 in other parts of the field, if desired.

In some embodiments, where open field game arrangement 10 utilizes local sensing system 30 comprising sensor 32 at target 14 to detect a projectile, a user inputs via a user interface which user is getting ready to launch a projectile, and once projectile is launched sensing system 30 comprising sensor 32 detects the projectile and communicates with controller 42 to generate a score and automatically display the score on the screen of scoring kiosk 18 or other device with a display screen like a smart phone. In some embodiments, where open field game arrangement 10 utilizes a tracking system disclosed herein to detect a projectile, a user inputs via a user interface which user is getting ready to launch a projectile, and once projectile is launched the tracking system tracks the projectile to determine a proximity event to detect whether the projectile hit target 14 and communicates with controller 42 to generate a score and automatically display the score on the screen of scoring kiosk 18 or other device with a display screen like a the smart phone. In some embodiments, instead of controller 42 automatically calculating score and sending to the screen of scoring kiosk 18 or other device with a display screen like a smart phone, such scores can be manually entered by a user.

Figure 14:
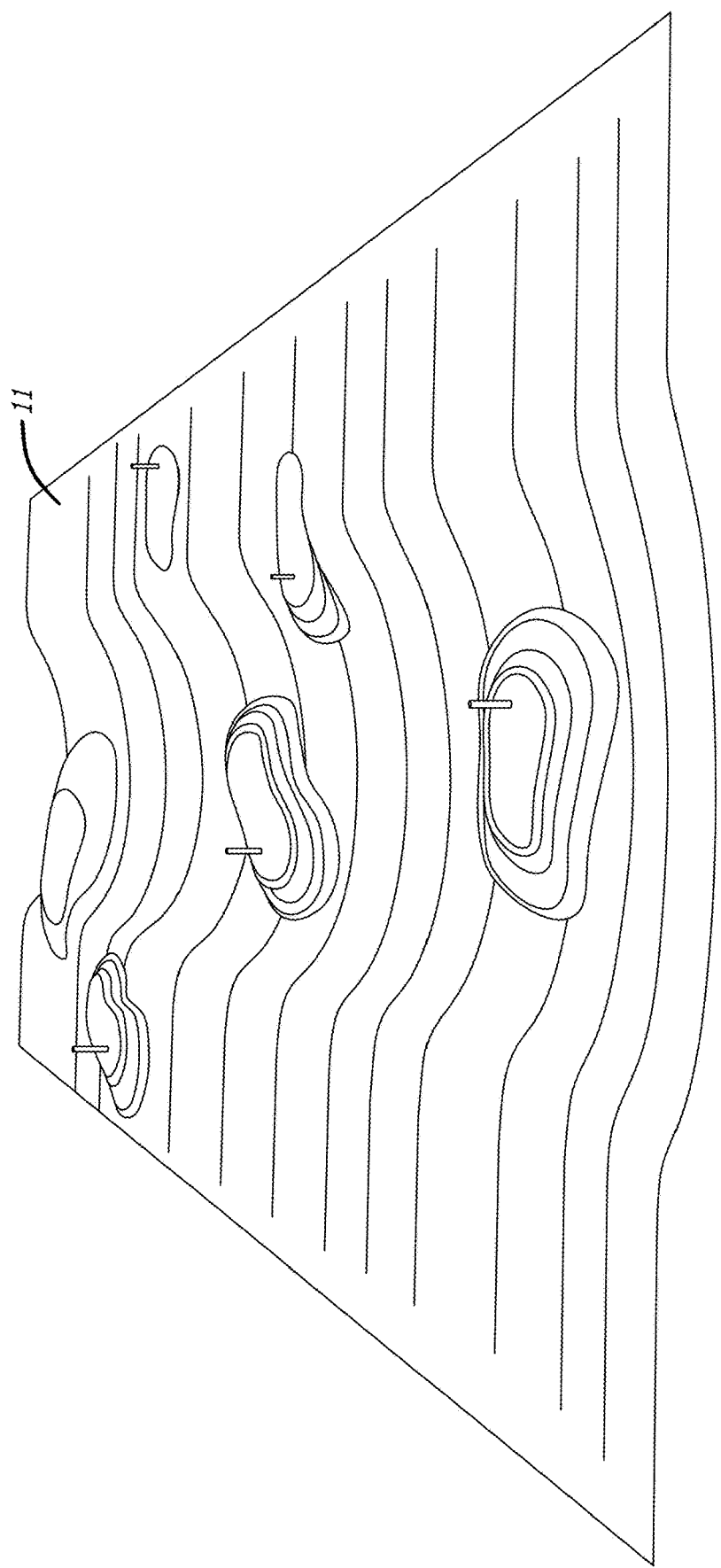
FIG. 14 is an end view of an alternative embodiment of an open field game arrangement disclosed herein.

In another alternative embodiment, as shown in FIG. 14, a field area portion of open field game arrangement 10 located between targets 14 is made of or covered by sheet 100. Sheet 11 can be made of vinyl or polyethylene or other plastic material instead of synthetic turf. Furthermore, in this alternative embodiment, the ground underneath field area portion covered by sheet 11 is graded so that a circular projectile automatically roll down to one or more basins or gathering areas. In this arrangement, projectiles can be collected without requiring a person to go all around the field picking up the circular projectiles launched by a user onto open field game arrangement 10. These basins also include drains, for draining away water that falls onto the plastic sheet. In this arrangement, target 14 may be independent of sheet 11, or target 14 may be adhered to or fused to sheet 11 or otherwise secured to sheet 11. In some embodiments, where flat target 14H is used, and if everything except top skin 94 is recessed into the ground, top skin 94 may be fused to sheet 11. Vinyl field design can use multiple colors of material to simulate the look of golf. This arrangement does not require extensive ground irrigation, as compared to water permeable synthetic turf.

In some embodiments, as shown in FIG. 15, an open field game arrangement 100 comprises one or more display projectors 110 configured to project two- or three-dimension virtual images about open field game arrangement 100. One or more display projectors 110 can be located in launch area 12, located within the play field of open field game arrangement 100, or both. The projected virtual image serves as a two-dimension or planar target or a three-dimension or holographic target. Display projector 110 can comprise a volumetric display device and a light field or holographic display device. A volumetric display device uses some physical mechanism to display points of light within a volume to form a visual representation of an object in three physical dimensions. Non-limiting examples of a volumetric display device disclosed herein include, e.g., swept-surface (or "swept-volume") volumetric 3D displays, and static-volume volumetric 3D displays. A light field or holographic display device recreate a "light field" on the surface of the display by, e.g., emitting different light rays in different directions at each point on the display (ray-based or light field displays) or by recreating a wavefront in front of the display (wavefront-based or holographic displays). Non-limiting examples of a light field or holographic display device include, e.g., holographic display devices, integral imaging devices, and compressive light field display devices. There are different types of holographic display devices, such as hologram fan display devices, pyramid projectors, and digital micro-mirror devices. They use LED rotating imaging, holographic film, or coherent light beam to make the brain perceive objects in two or three dimensions.

A projected virtual image disclosed herein can be a theme-oriented projected virtual image. Non-limiting examples of such theme-oriented projected virtual images include a holiday theme, a sports theme, a theme based on a movie or TV show, a theme based on a video game, a theme based on song, musical, or opera.

In some embodiments, display projector 110 can further comprise a tracking system disclosed herein. In these embodiments, a tracking system disclosed herein detects and tracks the trajectory of a projectile to determine a proximity event and detect whether a projectile hit or missed a particular planar or holographic target. A tracking system disclosed herein will then signal to response system 40 to respond appropriately with light and sound effects and/or to a scoring system disclosed herein to update the score of a user.

In some embodiments, open field game arrangement 100 comprises one or more display projectors 110 can further comprise one or more unmanned ground targets 14K, one or more unmanned ariel targets 14L, or a combination thereof. In aspects of these embodiments, one or unmanned ground targets 14K and/or the one or more unmanned ariel targets 14L establish one or more detection fields 60 that are associate with a particular portion or image of a projected virtual image disclosed herein serving as a planar or holographic target. In other aspects of these embodiments, one or unmanned ground targets 14K and/or the one or more unmanned ariel targets 14L serve as a target disclosed herein by generating one or more detection fields 60 or comprising banner target 14G.

One or more display projectors 110 can also be integrated or otherwise combined with one or more unmanned ground targets 14K, one or more unmanned ariel targets 14L, or a combination thereof. In these embodiments, the unmanned ground targets 14K and/or unmanned ariel targets 14L both project one or more two- or three-dimension virtual images about open field game arrangement 100 as well as define one or more two- or three-dimension shapes that serve as one or more detection fields 60.

Referring to FIG. 15, exemplary open field game arrangement 100 comprises launch area 12 and one or more display projectors 110 positioned at various locations within open field game arrangement 100. Display projectors 110 generate one or more planar or holographic targets 114 of a castle 114A, a pirate ship 114B, and a clown 114C. In some embodiments, one or more control systems 20, each comprising sensing system 30, response system 40, and power source 50 are used to define a detection field 60 in associated with one or more planar or holographic targets 114. In some embodiments, open field game arrangement 100 can include one or more unmanned ground targets 14K and one or more unmanned ariel targets 14L. These unmanned targets can serve as targets themselves or generate detection field 60 in association with one or more planar or holographic targets 114. Additionally, unmanned ground target 14K includes display projector 110 which generates an additional planar or holographic target, such as, e.g., a bullseye 114D. Similarly, unmanned aerial target 14L includes display projector 110 which generates an additional planar or holographic target, such as, e.g., a flying dragon 114E.

With respect to tracking and scoring, these are achieved using a control system disclosed herein like control system 20 that defines detection field 60 or control system 20 comprising a tracking system disclosed herein, or a tracking system disclosed herein located in launch area 12 like tracking system 35 or within display projector 110, unmanned ground target 14K and/or unmanned aerial target 14L. For example, referring to FIG. 15, one display projector 110 creates castle target 114A which is associated with control system 20 that uses sensing system 30, to detect a projectile and determine a proximity event, response system 40, to respond appropriately with light and sound effects and/or a scoring system disclosed herein to update the score of a user. Another display projector 110 creates ship target 114B and clown target 114C with control system 20 associated with ship target 114B and tracking system 35 associated with clown target 114C (alternatively a tracking system disclosed herein could be contained within display projector 110). In this example, control system 20 associated with ship target 114B uses sensing system 30 to detect a projectile and determine a proximity event to detect a hit or miss outcome, response system 40, to respond appropriately with light and sound effects and/or a scoring system disclosed herein to update the score of a user. On the other hand, for clown target 114C, tracking system 35 detects a projectile and determines a proximity event to detect a hit or miss outcome, and then signal to response system 40 to respond appropriately with light and sound effects and/or to a scoring system disclosed herein to update the score of a user. Unmanned ground target 14K creates bullseye target 114D and a tracking system disclosed herein that is contained within unmanned ground target 14K is used to detect a projectile and determines a proximity event to detect a proximity event to detect a hit or miss outcome, and then signal to response system 40 to respond appropriately with light and sound effects and/or signals to a scoring system disclosed herein to update the score of a user. Unmanned aerial target 14L creates flying dragon target 114D and control system 20 that is contained within unmanned ground target 14K is used to create a detection field 60. In this example, control system 20 associated with flying dragon target 114E uses sensing system 30 to detect a projectile's path to detection field 60 and determines a proximity event to detect a hit or miss outcome, which then signals to response system 40 to respond appropriately with light and sound effects and/or to a scoring system disclosed herein to update the score of a user. As shown in FIG. 15, other unmanned aerial targets 14L can operate in open field game arrangement 100 as actual targets by either creating detection field 60 or using banner target 14G as disclosed herein.

In some embodiments, and referring to FIG. 15, the sides of open field game arrangement 100 can further and optionally comprise banner targets 14G which, in conjunction with launch area 12, defines the area of open field game arrangement 100. Banner targets 14G may also serve as targets and may include markings indicating the distance from the tee (such as, e.g., 50 yards, 100 yards, 150 yards, 200 yards, 250 yards, 300 yards, and so forth). In some embodiments, an open field game arrangement 100 can further and optionally comprise one or more targets 14A-14J or one or more control systems 20 configured to serve as a target disclosed herein.

Aspects of the present specification can also be described by the following embodiments:

1. An open field game arrangement comprising a playing field, a launch area, and at least one control system; the playing field comprising one or more display projectors, each of the one or more display projectors configured to project one or more two- or three-dimension virtual images about the open field game arrangement; the at least one control system configured to establish one or more detection fields, with at least one of the one or more detection fields being in association with each of the one or more two- or three-dimension virtual images; and the at least one control system configured to detect when a projectile enters one of the one or more detection fields to trigger a proximity event that determines a hit or miss outcome of the projectile and to respond to the hit or miss outcome with a response comprising a light effect, a sound effect, a smoke effect, or any combination thereof.
2. The open field game arrangement of embodiment 1, wherein the one or more two- or three-dimension virtual images are oriented on a theme.
3. The open field game arrangement of embodiment 2, wherein the theme comprises a holiday theme, a sports theme, a movie theme, a television show theme, a video game theme, a song theme, a musical theme, or an operatic theme.
4. The open field game arrangement of any one of embodiments 1-3, wherein one of the at least one control system is integrated into at least one of the one or more display projectors.
5. The open field game arrangement of any one of embodiments 1-4, wherein one of the at least one control system is integrated into each of the one or more display projectors.
6. The open field game arrangement of any one of embodiments 1-4, wherein the at least one control system comprises a sensing system and a response system or a tracking system and a response system.
7. The open field game arrangement of any one of embodiments 1-4, wherein one of the at least one control system comprises a sensing system and a response system.
8. The open field game arrangement of embodiment 7, wherein each of the at least one control system comprises a sensing system and a response system.
9. The open field game arrangement of any one of embodiments 1-4, wherein one of the at least one control system comprises a tracking system and a response system.
10. The open field game arrangement of embodiment 9, wherein each of the at least one control system comprises a tracking system and a response system.
11. The open field game arrangement of any one of embodiments 1-10, further comprising one or more unmanned vehicles.
12. The open field game arrangement of embodiment 11, wherein at least one of the at least one control system is integrated into at least one of the one or more unmanned vehicles.
13. The open field game arrangement of embodiment 12, wherein at least one of the at least one control system is integrated into each of the one or more unmanned vehicles.
14. The open field game arrangement of any one of embodiments 11-13, wherein at least one of the one or more display projectors is integrated into at least one of the one or more unmanned vehicles.
15. The open field game arrangement of embodiment 14, wherein at least one of the one or more display projectors is integrated into each of the one or more unmanned vehicles.
16. The open field game arrangement of any one of embodiments 12-15, wherein the at least one control system comprises a sensing system and a response system or a tracking system and a response system.
17. The open field game arrangement of any one of embodiments 12-15, wherein one of the at least one control system comprises a sensing system and a response system.
18. The open field game arrangement of embodiment 17, wherein each of the at least one control system comprises a sensing system and a response system.
19. The open field game arrangement of any one of embodiments 12-15, wherein one of the at least one control system comprises a tracking system and a response system.
20. The open field game arrangement of embodiment 19, wherein each of the at least one control system comprises a tracking system and a response system.
21. The open field game arrangement of any one of embodiments 11-20, wherein the one or more unmanned vehicles are used solely to establish at least one of the one or more detection fields associated with at least one of the one or more two- or three-dimension virtual images, solely as an unmanned target that establish one or more detection fields not associated with at least one of the one or more two- or three-dimension virtual images, or any combination thereof.
22. The open field game arrangement of any one of embodiments 11-20, wherein at least one of the one or more unmanned vehicles is used solely to establish at least one of the one or more detection fields associated with at least one of the one or more two- or three-dimension virtual images.
23. The open field game arrangement of embodiment 22, wherein each one of the one or more unmanned vehicles is used solely to establish at least one of the one or more detection fields associated with at least one of the one or more two- or three-dimension virtual images.
24. The open field game arrangement of any one of embodiments 11-20, wherein at least one of the one or more unmanned vehicles is used solely as an unmanned target that establish one or more detection fields not associated with at least one of the one or more two- or three-dimension virtual images.
25. The open field game arrangement of embodiment 24, wherein each of the one or more unmanned vehicles is used solely as an unmanned target that establish one or more detection fields not associated with at least one of the one or more two- or three-dimension virtual images.
26. The open field game arrangement of any one of embodiments 11-25, the one or more unmanned vehicles comprise one or more unmanned ground vehicles or one or more unmanned aerial vehicles.
27. The open field game arrangement of any one of embodiments 1-26, wherein the proximity event is based on a binary detection system that determines a hit or miss outcome.
28. The open field game arrangement of any one of embodiments 1-26, wherein the proximity event is based on a gradated detection system that determines a hit or miss outcome.
29. The unmanned target of any one of embodiments 1-28, wherein each of the one or more detection fields is a two- or three-dimension area.
30. The open field game arrangement of any one of embodiments 1-29, wherein the at least one control system further comprises a scoring system.
31. The open field game arrangement of any one of embodiments 1-29, wherein at least one of the at least one control system further comprises a scoring system.
32. The open field game arrangement of embodiment 31, wherein each of the at least one control system further comprises a scoring system.

33. The open field game arrangement of any one of embodiments 30-32, wherein the scoring system comprises a binary scoring system based on the binary detection system.
34. The open field game arrangement of any one of embodiments 30-32, wherein the scoring system comprises a gradated scoring system based on the gradated detection system.
35. The open field game arrangement of any one of embodiments 1-34, further comprising one or more pylon targets, one or more dome targets, one or more floating dome targets, one or more transparent dome targets, one or more pop-up dome targets, one or more skirt targets, one or more banner targets, one or more flat targets, one or more control system targets, one or more mobile manned ground targets, or any combination thereof.
36. An unmanned target comprising an unmanned vehicle comprising a control system, the control system configured to establish one or more detection fields and to detect when a projectile enters one of the one or more detection fields to trigger a proximity event that determines a hit or miss outcome of the projectile and to respond to the hit or miss outcome with a response comprising a light effect, a sound effect, a smoke effect, or any combination thereof.
37. The unmanned target of embodiment 36, wherein the control system comprises a sensing system and a response system or a tracking system and a response system.
38. The unmanned target of embodiment 37, wherein the control system comprises a sensing system and a response system.
39. The unmanned target of embodiment 37, wherein the control system comprises a tracking system and a response system.
40. The unmanned target of any one of embodiments 36-39, wherein the unmanned target further comprises a display projector configured to project a two- or three-dimension virtual image.
41. The unmanned target of any one of embodiments 36-40, wherein the control system established the one or more detection fields in association with a physical structure, in association with a two- or three-dimension virtual image, in association with a ground space, in association with an air space, or any combination thereof.
42. The unmanned target of any one of embodiments 36-40, wherein the control system established at least one of the one or more detection fields in association with a physical structure, in association with a two- or three-dimension virtual image, in association with a ground space, or in association with an air space.
43. The unmanned target of embodiment 42, wherein the control system established each of the one or more detection fields in association with a physical structure, in association with a two- or three-dimension virtual image, in association with a ground space, or in association with an air space.
44. The unmanned target of any one of embodiments 36-43, wherein each of the one or more detection fields is a two- or three-dimension area.
45. The unmanned target of any one of embodiments 36-44, wherein the proximity event is based on a binary detection system that determines a hit or miss outcome.
46. The unmanned target of any one of embodiments 36-44, wherein the proximity event is based on a gradated detection system that determines a hit or miss outcome.
47. The unmanned target of any one of embodiments 36-46, wherein each of the one or more detection fields is a two- or three-dimension area.
48. The unmanned target of any one of embodiments 36-47, wherein the control system further comprises a scoring system.
49. The unmanned target of embodiment 48, wherein the scoring system comprises a binary scoring system based on the binary detection system.
50. The unmanned target of embodiment 48, wherein the scoring system comprises a gradated scoring system based on the gradated detection system.
51. The unmanned target of any one of embodiments 36-50, wherein the unmanned target is an unmanned ground target or an unmanned aerial target.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention and such examples are not limiting thereto. As such, the specific embodiments are not intended to be exhaustive or to limit the invention to the precise forms disclosed. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims. In addition, all methods described herein can be performed in any suitable order unless otherwise indicated herein or otherwise clearly contradicted by context. Therefore, it should be understood that embodiments of the disclosed subject matter are in no way limited to a particular element, compound, composition, component, article, apparatus, methodology, use, protocol, step, and/or limitation described herein, unless expressly stated as such.

While aspects of the invention have been described with reference to at least one exemplary embodiment, it is to be clearly understood by those skilled in the art that the invention is not limited thereto. Furthermore, those of ordinary skill in the art will recognize that certain changes, modifications, permutations, alterations, additions, subtractions, and sub-combinations thereof can be made in accordance with the teachings herein without departing from the spirit of the present invention. It is intended that the following appended claims and claims hereafter introduced are interpreted to include all such changes, modifications, permutations, alterations, additions, subtractions, and sub-combinations as are within their true spirit and scope. Accordingly, the scope of the present invention is not to be limited to that precisely as shown and described by this specification. Rather, the scope of the invention is to be interpreted only in conjunction with the appended claims and it is made clear, here, that the inventor(s) believe that the claimed subject matter is the invention.

Certain embodiments of the present invention are described herein, including the best mode known to the inventors for conducting the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step, or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps and/or limitations may be made for any one of the elements, steps or limitations in a claim set forth below or that a single element, step, or limitation may be substituted for two or more elements, steps and/or limitations in such a claim. Although elements, steps or limitations may be described above as acting in certain combinations and even initially claimed as such, it is to be expressly understood that one or more elements, steps and/or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more, or different elements, steps and/or limitations, which are disclosed in above combination even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Unless the context dictates the contrary, all ranges set forth herein should be interpreted as being inclusive of their endpoints and open-ended ranges should be interpreted to include only commercially practical values. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a comparable manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators-such as, e.g., "first," "second," "third," etc.—for identified elements are used to distinguish between the elements, and do not indicate or imply a required or limited number of such elements, and do not indicate a particular position or order of such elements unless otherwise specifically stated.

When used in the claims, whether as filed or added per amendment, the open-ended transitional term "comprising", variations thereof such as, e.g., "comprise" and "comprises", and equivalent open-ended transitional phrases thereof like "including", "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that the methods and the order in which the respective elements of each method are performed are purely exemplary. Depending on the implementation, they may be performed in any order or in parallel, unless indicated otherwise in the present disclosure.

Finally, all patents, patent publications, and other references cited and identified in the present specification are individually and expressly incorporated herein by reference in their entirety to the same extent as if each individual publication or patent application were specifically and individually indicated to be incorporated by reference. These publications are provided solely for their disclosure prior to the filing date of the present application. The reference to any prior art in this specification is not, and should not be taken as, an acknowledgement or any form of suggestion that the prior art forms part of the common general knowledge from any country. In addition, where a definition or use of a term in an incorporated reference is inconsistent or contrary to the definition of that term provided herein, the definition of that term provided herein applies and the definition of that term in the reference does not apply. Lastly, nothing in this regard is or should be construed as an admission that the inventors are not entitled to antedate such disclosure by virtue of prior invention or for any other reason. All statements as to the date or representation as to the contents of these documents are based on the information available to the applicant and do not constitute any admission as to the correctness of the dates or contents of these documents.

The invention claimed is:

1. An open field game arrangement comprising a playing field, a launch area, and at least one control system;
   the playing field comprising one or more display projectors, each of the one or more display projectors configured to project one or more two- or three-dimension virtual images about the open field game arrangement;
   the at least one control system configured to establish one or more detection fields, with at least one of the one or more detection fields being in association with each of the one or more two- or three-dimension virtual images; and
   the at least one control system configured to detect when a projectile enters one of the one or more detection fields to trigger a proximity event that determines a hit or miss outcome of the projectile and to respond to the hit or miss outcome with a response comprising a light effect, a sound effect, a smoke effect, or any combination thereof.

2. The open field game arrangement of claim 1, wherein the one or more two- or three-dimension virtual images are oriented on a theme.

3. The open field game arrangement of claim 2, wherein the theme comprises a holiday theme, a sports theme, a movie theme, a television show theme, a video game theme, a song theme, a musical theme, or an operatic theme.

4. The open field game arrangement of claim 1, wherein one of the at least one control system is integrated into at least one of the one or more display projectors, and/or
wherein one of the at least one control system is integrated into each of the one or more display projectors, and/or
wherein the at least one control system comprises a sensing system and a response system or a tracking system and a response system, and/or
wherein one of the at least one control system comprises a sensing system and a response system, and/or
wherein each of the at least one control system comprises a sensing system and a response system, and/or
wherein one of the at least one control system comprises a tracking system and a response system.

5. The open field game arrangement of claim 1, further comprising one or more unmanned vehicles.

6. The open field game arrangement of claim 5, wherein at least one of the at least one control system is integrated into at least one of the one or more unmanned vehicles, and/or
wherein at least one of the one or more display projectors is integrated into at least one of the one or more unmanned vehicles.

7. The open field game arrangement of claim 5, wherein the at least one control system comprises a sensing system and a response system or a tracking system and a response system.

8. The open field game arrangement of claim 5, wherein the one or more unmanned vehicles are used solely to establish at least one of the one or more detection fields associated with at least one of the one or more two- or three-dimension virtual images, solely as an unmanned target that establish one or more detection fields not associated with at least one of the one or more two- or three-dimension virtual images, or any combination thereof.

9. The open field game arrangement of claim 5, the one or more unmanned vehicles comprise one or more unmanned ground vehicles or one or more unmanned aerial vehicles.

10. The open field game arrangement of claim 1, wherein the proximity event is based on a binary detection system that determines a hit or miss outcome, or wherein the proximity event is based on a gradated detection system that determines a hit or miss outcome.

11. The unmanned target of claim 1, wherein each of the one or more detection fields is a two- or three-dimension area.

12. The open field game arrangement of claim 1, wherein the at least one control system further comprises a scoring system.

13. The open field game arrangement of claim 12, wherein the scoring system comprises a binary scoring system based on the binary detection system, or wherein the scoring system comprises a gradated scoring system based on the gradated detection system.

14. An unmanned target comprising an unmanned vehicle comprising a control system, the control system configured to establish one or more detection fields and to detect when a projectile enters one of the one or more detection fields to trigger a proximity event that determines a hit or miss outcome of the projectile and to respond to the hit or miss outcome with a response comprising a light effect, a sound effect, a smoke effect, or any combination thereof.

15. The unmanned target of claim 14, wherein the control system comprises a sensing system and a response system or a tracking system and a response system, and/or
wherein the control system established the one or more detection fields in association with a physical structure, in association with a two- or three-dimension virtual image, in association with a ground space, in association with an air space, or any combination thereof, and/or
wherein the control system established at least one of the one or more detection fields in association with a physical structure, in association with a two- or three-dimension virtual image, in association with a ground space, or in association with an air space, and/or
wherein the proximity event is based on a binary detection system that determines a hit or miss outcome, or a gradated detection system that determines a hit or miss outcome.

16. The unmanned target of claim 14, wherein each of the one or more detection fields is a two- or three-dimension area.

17. The unmanned target of claim 14, wherein the control system further comprises a scoring system.

18. The unmanned target of claim 17, wherein the scoring system comprises a binary scoring system based on the binary detection system, or a gradated scoring system based on the gradated detection system.

19. The unmanned target of claim 14, wherein the unmanned target is an unmanned ground target or an unmanned aerial target.

20. The unmanned target of claim 14, wherein the unmanned target further comprises a display projector configured to project a two- or three-dimension virtual image.

* * * * *